(12) United States Patent
Nguyen et al.

(10) Patent No.: US 12,148,184 B2
(45) Date of Patent: Nov. 19, 2024

(54) TEMPORALLY CONSISTENT POSITION ESTIMATION REFINEMENT FOR AERIAL REFUELING

(71) Applicant: The Boeing Company, Chicago, IL (US)

(72) Inventors: Leon Nhat Nguyen, Santa Ana, CA (US); Haden Harrison Smith, Topanga, CA (US); Fan Hin Hung, Los Angeles, CA (US); Deepak Khosla, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 17/569,448

(22) Filed: Jan. 5, 2022

(65) Prior Publication Data

US 2023/0215042 A1 Jul. 6, 2023

(51) Int. Cl.
*G06T 7/73* (2017.01)
*B64D 39/00* (2006.01)
(Continued)

(52) U.S. Cl.
CPC .............. *G06T 7/75* (2017.01); *B64D 39/00* (2013.01); *G05D 1/104* (2013.01); *G06T 19/006* (2013.01)

(58) Field of Classification Search
CPC .................... G06T 7/75; G06T 19/006; G06T 2207/10016; G06T 2207/20081;
(Continued)

(56) References Cited

U.S. PATENT DOCUMENTS

| 5,499,784 A | 3/1996 | Crabere et al. |
| 5,904,729 A | 5/1999 | Ruzicka |

(Continued)

FOREIGN PATENT DOCUMENTS

| WO | 2009152091 A2 | 12/2009 |
| WO | 2022014354 A1 | 1/2022 |

OTHER PUBLICATIONS

Ben Mildenhall et al., "NeRF: Representing Scenes as Neural Radiance Fields for View Synthesis", arXiv:2003.08934v2 [cs.CV] Aug. 3, 2020], pp. 1-25.*

(Continued)

*Primary Examiner* — Samir A Ahmed
(74) *Attorney, Agent, or Firm* — Jordan IP Law, LLC

(57) ABSTRACT

Aspects of the disclosure provide fuel receptacle position estimation for aerial refueling (derived from aircraft position estimation). A video stream comprising a plurality of video frames each showing an aircraft to be refueled, is received from a single camera. An initial position estimate is determined for the aircraft for the plurality of video frames, generating an estimated flight history for the aircraft. The estimated flight history for the aircraft is used to determine a temporally consistent refined position estimate, based on known aircraft flight path trajectories in an aerial refueling setting. The position of a fuel receptacle on the aircraft is determined, based on the refined position estimate for the aircraft, and an aerial refueling boom may be controlled to engage the fuel receptacle. Examples may use a deep learning neural network (NN) or optimization (e.g., bundle adjustment) to determine the refined position estimate from the estimated flight history.

40 Claims, 17 Drawing Sheets

(51) Int. Cl.
  *G05D 1/00*    (2006.01)
  *G06T 19/00*   (2011.01)
(58) Field of Classification Search
  CPC .......... G06T 2207/20084; B64D 39/00; B64D 37/14; B64D 43/00; G05D 1/104; G06V 20/17; G06V 10/25; G06V 10/82; G06V 20/46; G03B 15/006; G06N 3/045; G06N 3/0464; G06N 3/098; H04N 7/183
  See application file for complete search history.

(56) References Cited

U.S. PATENT DOCUMENTS

| | | | |
|---|---|---|---|
| 9,150,310 | B1 | 10/2015 | Bray et al. |
| 9,437,113 | B2 | 9/2016 | Bush et al. |
| 9,840,036 | B1 | 12/2017 | Wabnig et al. |
| 11,074,717 | B2 | 7/2021 | Tremblay et al. |
| 2003/0026505 | A1 | 2/2003 | Florent et al. |
| 2003/0209633 | A1 | 11/2003 | Thal et al. |
| 2010/0274444 | A1 | 10/2010 | Williamson et al. |
| 2010/0321011 | A1* | 12/2010 | Small .................. B64U 80/40 244/76 R |
| 2014/0216088 | A1* | 8/2014 | Weber .................. B64D 37/34 165/41 |
| 2017/0301109 | A1 | 10/2017 | Chan et al. |
| 2018/0210466 | A1* | 7/2018 | Weaver .................. G05D 1/104 |
| 2019/0122073 | A1 | 4/2019 | Ozdemir et al. |
| 2019/0382126 | A1 | 12/2019 | Rix et al. |
| 2020/0379486 | A1* | 12/2020 | Khosla .............. G05B 13/0265 |
| 2021/0039804 | A1 | 2/2021 | Ropers |
| 2021/0403175 | A1* | 12/2021 | Kyono ................. G06F 18/214 |

OTHER PUBLICATIONS

Weijun Mai et al., "Feature-aided Bundle Adjustment Learning Framework for Self-supervised Monocular Visual Odometry", 2021 IEEE/RSJ International Conference on Intelligent Robots and Systems (IROS) Sep. 27-Oct. 1, 2021. Prague, Czech Republic.*

Extended European Search Report, Application No. 23150273.3, Mailed May 26, 2023.

Mammarella M. et al., "Machine Vision/Gps Integration Using EKF for the UAV Aerial Refueling Problem," IEEE Transactions on Systems, Man, and Cybernetics: Part C: Applications and Reviews, IEEE Service Center, Piscataway, NJ, US, vol. 38, No. 6, Nov. 30, 2008.

Sun Siyang et al., "Robust Visual Detection and Tracking Strategies for Autonomous Aerial Refueling of UAVs," IEEE Transactions on Instrumentation and Measurement, USA, vol. 68, No. 12, Dec. 31, 2019.

Sharma Sumant et al., "Neural Network-Based Pose Estimation for Noncooperative Spacecraft Rendezvous," IEEE Transactions on Aerospace and Electronic Systems, IEEE Service Center, Piscataway, NJ, US, vol. 5, No. 6, Jun. 2, 2020.

Zhang et al., "Binocular Pose Estimation for UAV Autonomous Aerial Refueling via Brain Storm Optimization," Conference: 2019 IEEE Congress on Evolutionary Computation (CEC), 8 pages. DOI:10.1109/CEC.2019.8789952.

Duan et al., "A binocular vision-based UAVs autonomous aerial refueling platform," Science China, Information Sciences, 2016, vol. 59, 7 pages. DOI:10.1007/s11432-016-5553-5.

Doebbler, et al., "Boom and Receptacle Autonomous Air Refueling Using Visual Snake Optical Sensor," Journal of Guidance and Control and Dynamics, vol. 30, No. 6, Nov. 1, 2007, 24 pages.

Anderson, et al., "Augmenting Flight Imagery from Aerial Refueling," In Proceedings of ISVC 2019, LNCS 11845, pp. 154-165, 2019.

Vendra, et al., "Addressing corner detection issues for machine vision based UAV aerial refueling," Machine Vision and Applications, Springer, Berlin, DE, vol. 18, No. 5, Jan. 10, 2007, pp. 261-273.

Duan, et al., "Visual Measurement in Simulation Environment for Vision-Based UAV Autonomous Aerial Refueling," IEEE Transactions on Instrumentation and Measurement, IEEE, USA, vol. 64, No. 9, Sep. 1, 2015, pp. 2468-2480.

Cui, et al., "Visual Servoing of a Flexible Aerial Refueling Boom With an Eye-in-Hand Camera," IEEE Transactions on Systems, Man, and Cybernetics: Systems, IEEE, Piscataway, NJ, USA, vol. 51, No. 10, Jan. 8, 2020, pp. 6282-6292.

Lynch, J. C., "Monocular Pose Estimation for Automated Aerial Refueling via Perspective-n-Point," Air Force Institute of Technology, Theses and Dissertations, 2022, pp. 1-76. https://scholar.afit.edu/etd/6910.

* cited by examiner

TEMPORALLY CONSISTENT POSITION ESTIMATION REFINEMENT FOR AERIAL REFUELING

BACKGROUND

Aerial refueling (air-to-air refueling) is typically performed manually, by a highly-skilled human refueling boom operator. Some arrangements place the human operator behind a window, with a view of the refueling boom and the aircraft to be refueled. This type of arrangement requires the added significant expense of providing accommodation for the human operator in the rear of the refueling platform.

Some arrangements use stereoscopic vision with dual cameras, in which the human operator wears goggles that provide a three-dimensional (3D) view based on the views from the dual cameras. Some other arrangements use light detection and ranging (LIDAR) or radar to provide supplemental range measurements for the human operator. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples provided herein include solutions for aerial refueling that include: receiving a video stream comprising a plurality of video frames, each video frame showing an aircraft to be refueled; determining, for each video frame of the plurality of video frames, an initial position estimate for the aircraft, wherein the initial position estimates for the plurality of video frames comprises an estimated flight history for the aircraft; based on at least the estimated flight history for the aircraft, determining, by an estimate refiner, a temporally consistent refined position estimate for the aircraft; based on at least the refined position estimate for the aircraft, determining a position of a fuel receptacle on the aircraft; and based on at least the position of the fuel receptacle, controlling an aerial refueling boom to engage the fuel receptacle.

BRIEF DESCRIPTION OF THE DRAWINGS

The disclosed examples are described in detail below with reference to the accompanying drawing figures listed below:

FIG. 2B shows an annotated version of the video frame 200a.

Corresponding reference characters indicate corresponding parts throughout the drawings in accordance with an example.

DETAILED DESCRIPTION

Figure 1:
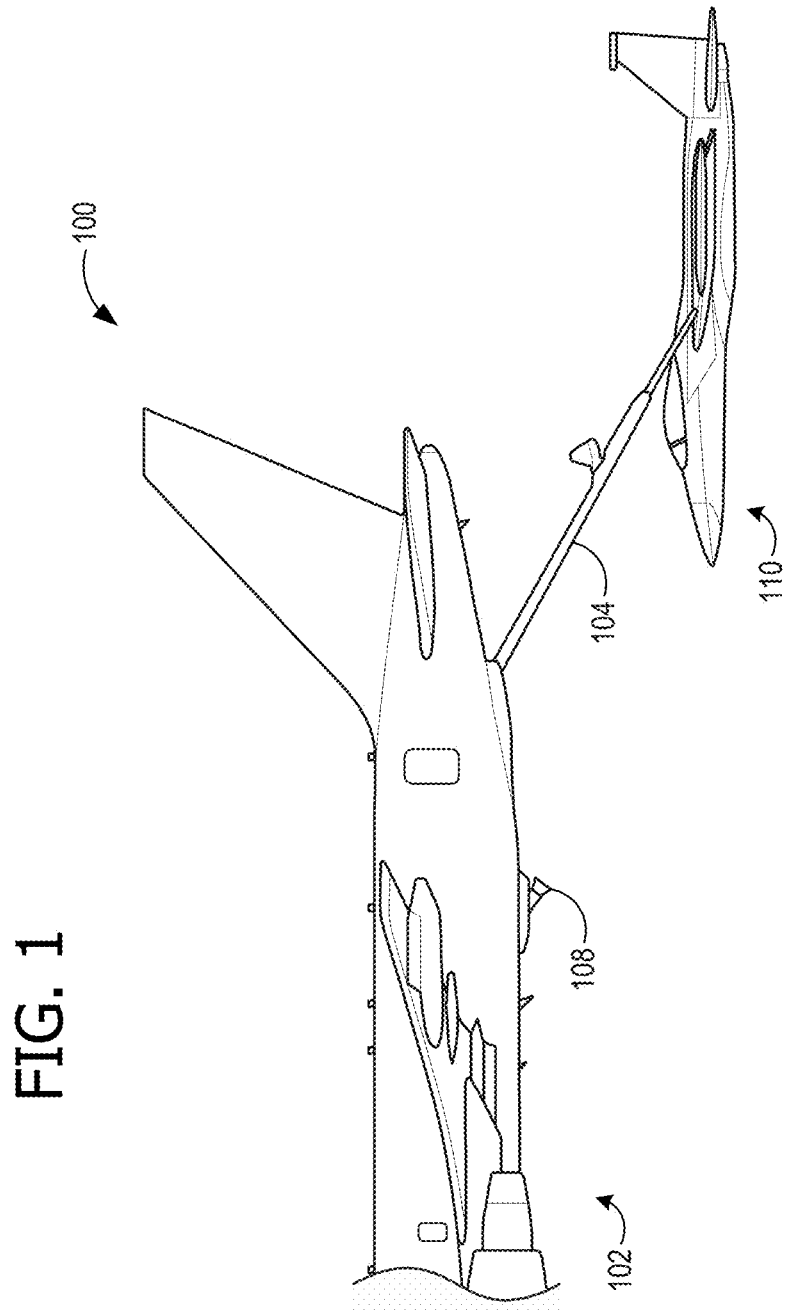
FIG. 1 illustrates an arrangement 100 that employs temporally consistent position estimation refinement for aerial refueling, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects and implementations disclosed herein are directed to fuel receptacle position estimation for aerial refueling (derived from aircraft position estimation). A video stream comprising a plurality of video frames each showing an aircraft to be refueled, is received from a single camera. An initial position estimate is determined for the aircraft for the plurality of video frames, generating an estimated flight history for the aircraft. The estimated flight history for the aircraft is used to determine a temporally consistent refined position estimate, based on known aircraft flight path trajectories in an aerial refueling setting. The position of a fuel receptacle on the aircraft is determined, based on the refined position estimate for the aircraft, and an aerial refueling boom may be controlled to engage the fuel receptacle.

Examples may use a deep learning neural network (NN) or optimization (e.g., bundle adjustment) to determine the refined position estimate from the estimated flight history.

Aspects of the disclosure have a technical effect of improved operation of a computer, for example by improving the efficiency of computational hardware, and improved allocation of resources, as compared with traditional systems that rely on, for example, processing multiple different measurement inputs. Aspects of the disclosure are able to estimate the position and orientation of a three-dimensional (3D) object (e.g., an aircraft fuel receptacle) in a video stream collected by a single camera, such as in support of autonomous aerial refueling operations and/or human-assisted aerial refueling operations. For example, aspects of the disclosure locate the relative positions and orientations of an aircraft fuel receptacle and a refueling platform's refueling boom in order to automate control of the refueling boom during refueling. In some examples, position and orientation information is represented as six degrees-of-freedom (6DoF) including both a 3D position (x, y, and z coordinates) and a 3D orientation (roll, pitch, and yaw).

The location occurs in stages, such as determining initial 3D position and 3D orientation estimates (together an initial 6DoF position estimate) for the aircraft for each video frame of a plurality of video frames. This generates an estimated flight history for the aircraft, which is passed to an estimate refiner to determine a temporally consistent refined position estimate for the aircraft. From the refined position estimate for the aircraft, the position of a fuel receptacle on the aircraft may be determined, enabling controlling an aerial refueling boom to engage the fuel receptacle.

Referring more particularly to the drawings, FIG. 1 illustrates an arrangement 100 that includes a refueling platform 102 and an aircraft 110 to be refueled. Each of the refueling platform 102 and the aircraft 110 may be an example of a flying apparatus 1401, described in further retail in relation to FIGS. 14 and 15. In the arrangement 100, the refueling platform 102 uses an aerial refueling boom 104 to refuel the aircraft 110. A camera 108 provides a video stream 200 (shown in FIG. 3) for use in pose estimation.

Figure 2A:
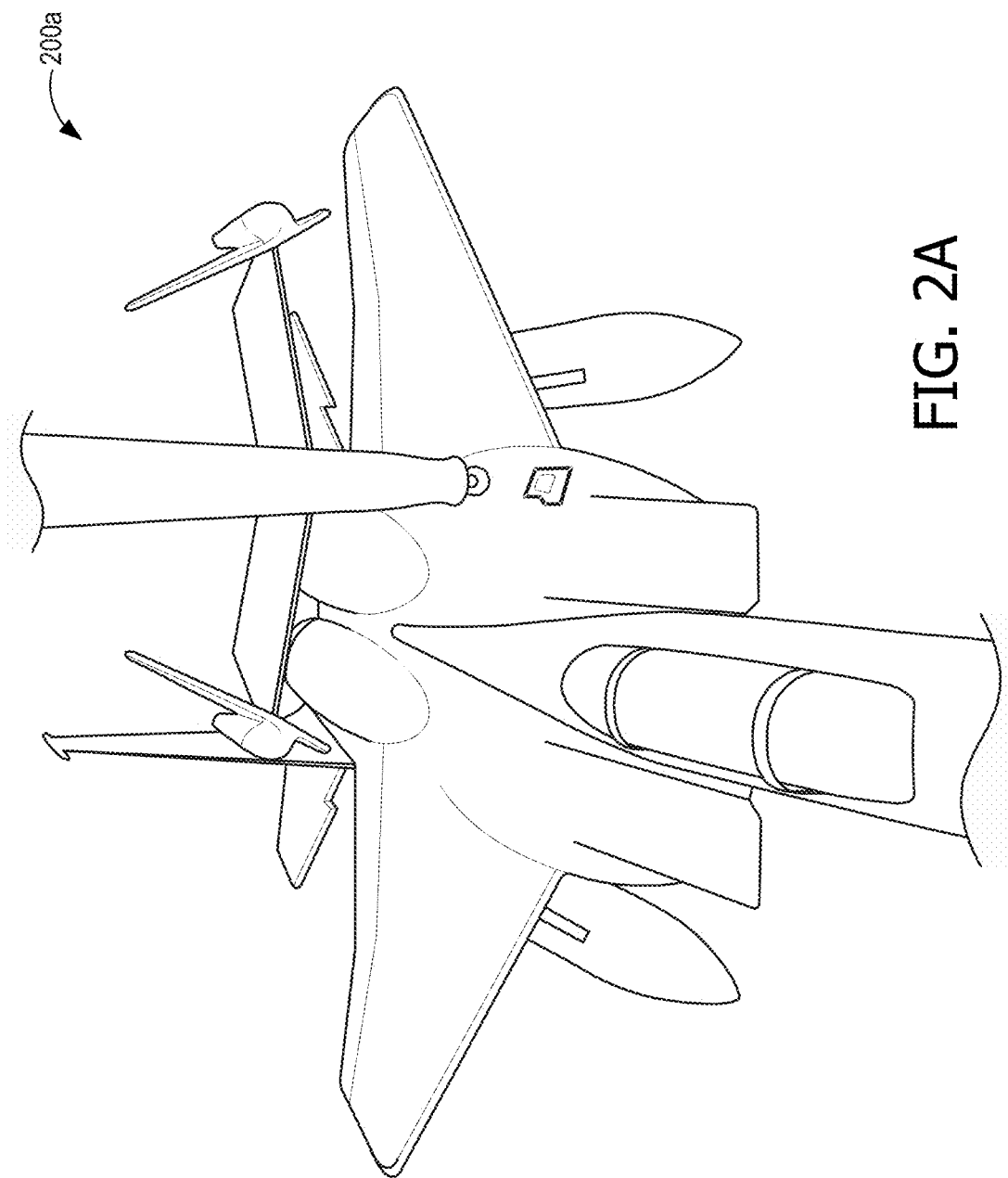
FIG. 2A shows a representative video frame 200a from an aerial refueling operation, in accordance with an example.
Figure 2B:
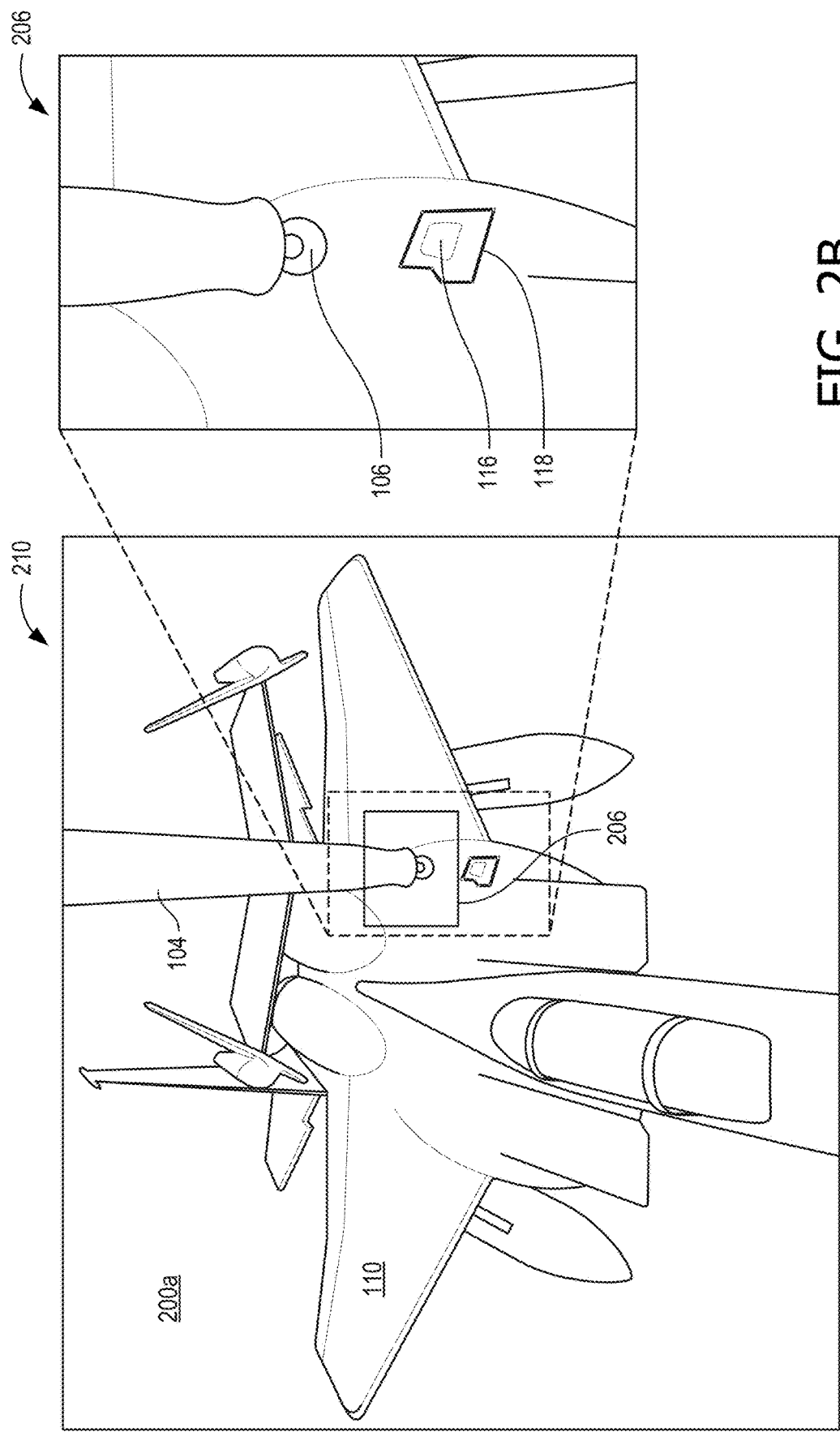

FIG. 2A shows a representative video frame 200a from an aerial refueling operation. For clarity, FIG. 2A shows only a clean version of the video frame 200a. FIG. 2B shows an annotated version of the video frame 200a. The video frame 200a shows a cropped view of the aircraft 110 and the aerial refueling boom 104 as may be seen in within an aircraft bounding box 210. The aircraft bounding box 210 is generated by an early stage of an aircraft pose estimation pipeline 400, which is described below in relation to FIG. 4. The aircraft 110 has a fuel receptacle 116, which is outlined by a fiducial marker 118. The video frame 200a also shows the aerial refueling boom 104, with a boom tip 106, outlined with a boom tip bounding box 206. The boom tip bounding box 206 is generated by an early stage of a boom tip pose estimation pipeline 900, which is described below in relation to FIG. 9. In operation, the aerial refueling boom 104 delivers fuel to the aircraft 110 by the boom tip 106 engaging the fuel receptacle 116. The fiducial marker 118 facilitates location of the fuel receptacle 116 on the aircraft 110.

Figure 3:
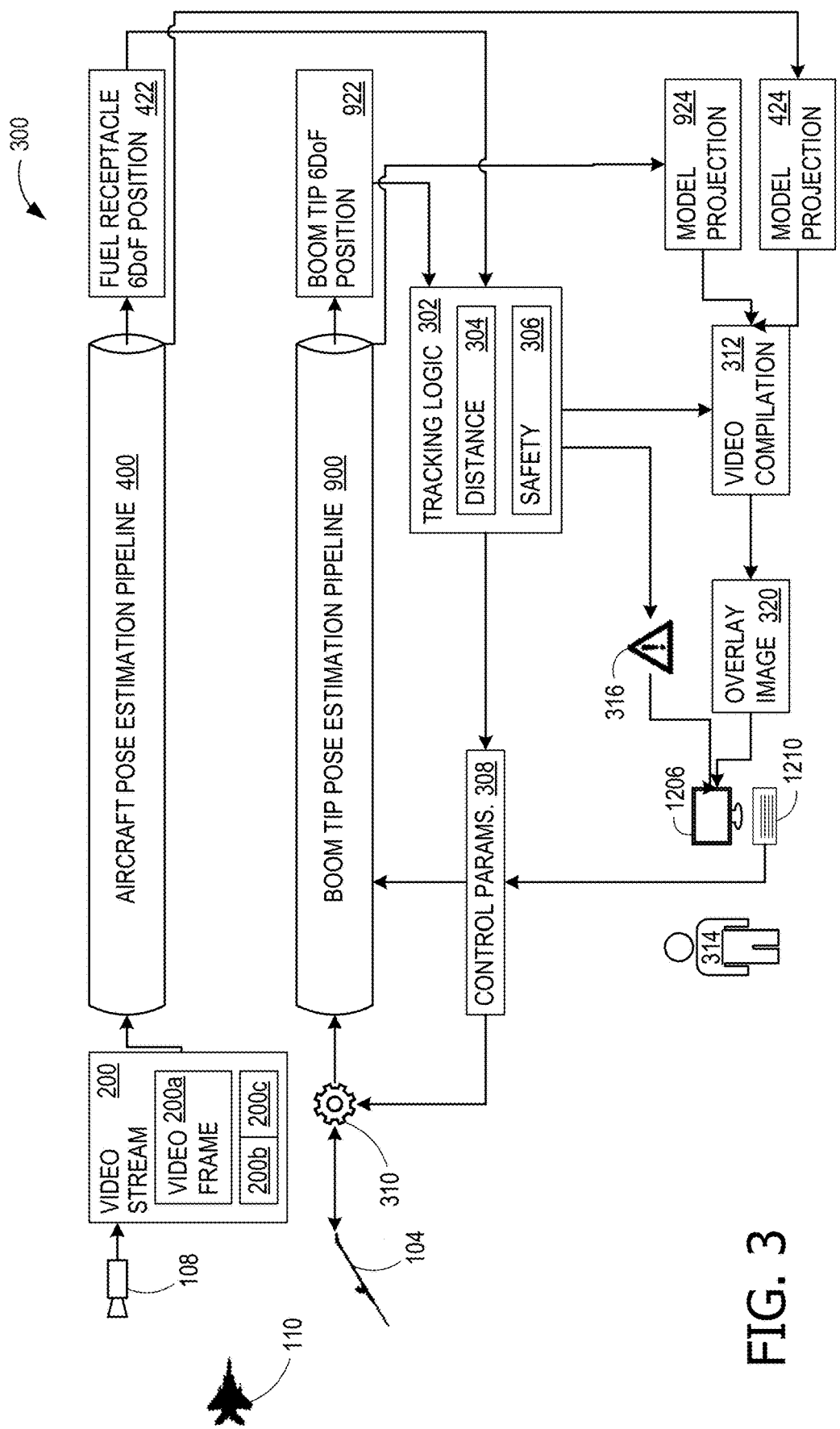
FIG. 3 illustrates a block diagram of a computer vision (CV) architecture 300 that can be used in the arrangement 100, in accordance with an example.

FIG. 3 illustrates a block diagram of a computer vision (CV) architecture 300 that performs fuel receptacle and boom tip pose estimation for the arrangement 100. The components of the architecture 300 are identified in FIG. 3, with further detail shown in FIGS. 4, 6, 7, and 9, and the operation of the architecture 300 is described in further detail in relation to FIG. 10 (showing a flowchart 1000). The architecture 300 receives a video stream 200 comprising a plurality of video frames (e.g., video frame 200a, video frame 200b, and video frame 200c) from the camera 108. The processing of the video frame 200a will be described. Processing of other video frames in the plurality of video frames 200a-200c is similar to that described for the video frame 200a.

Figure 4:
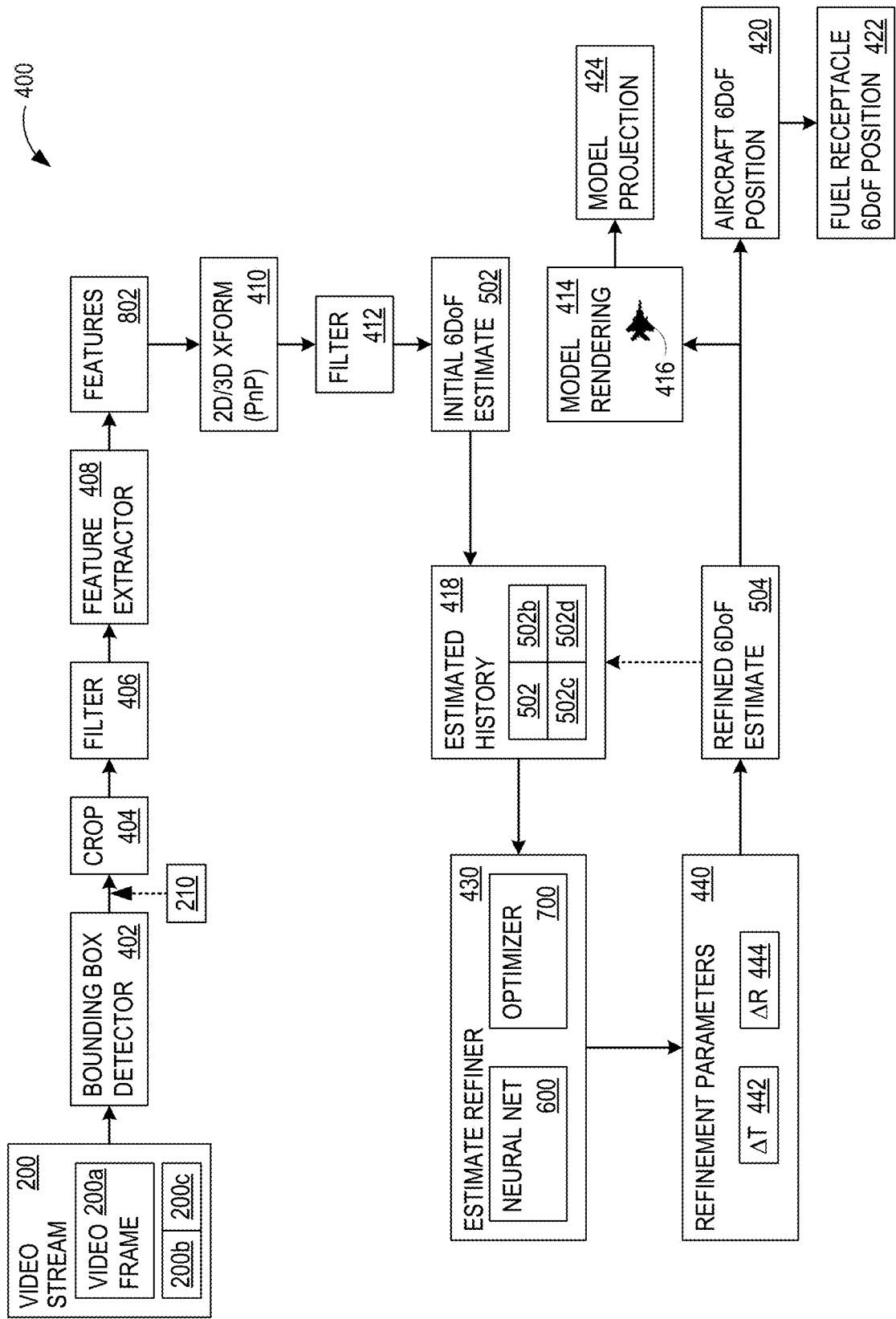
FIG. 4 illustrates a block diagram of an aircraft pose estimation pipeline 400, in accordance with an example.
Figure 6:
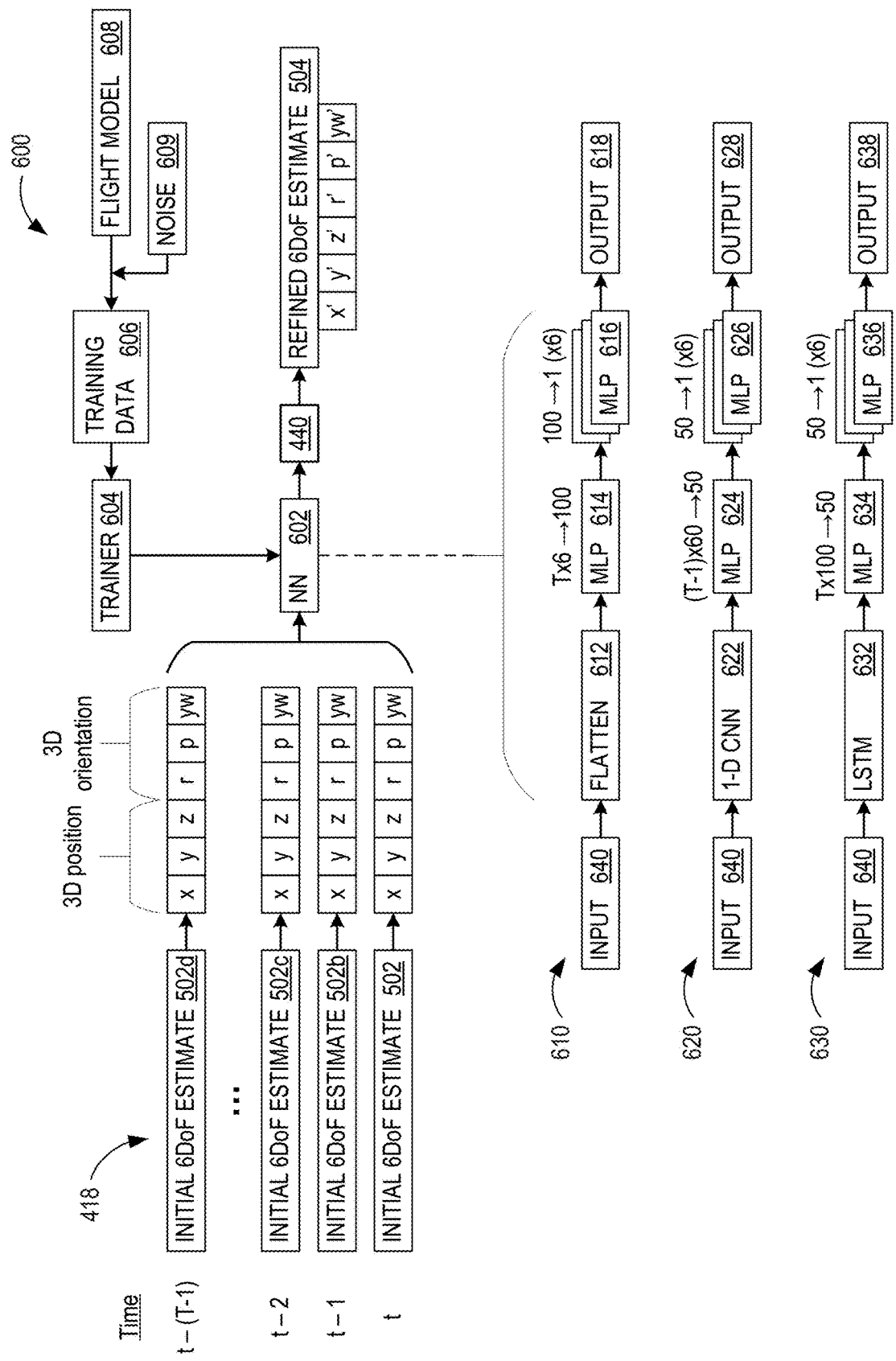
FIG. 6 illustrates a neural network (NN) estimate refiner 600 for temporal refinement.
Figure 7:
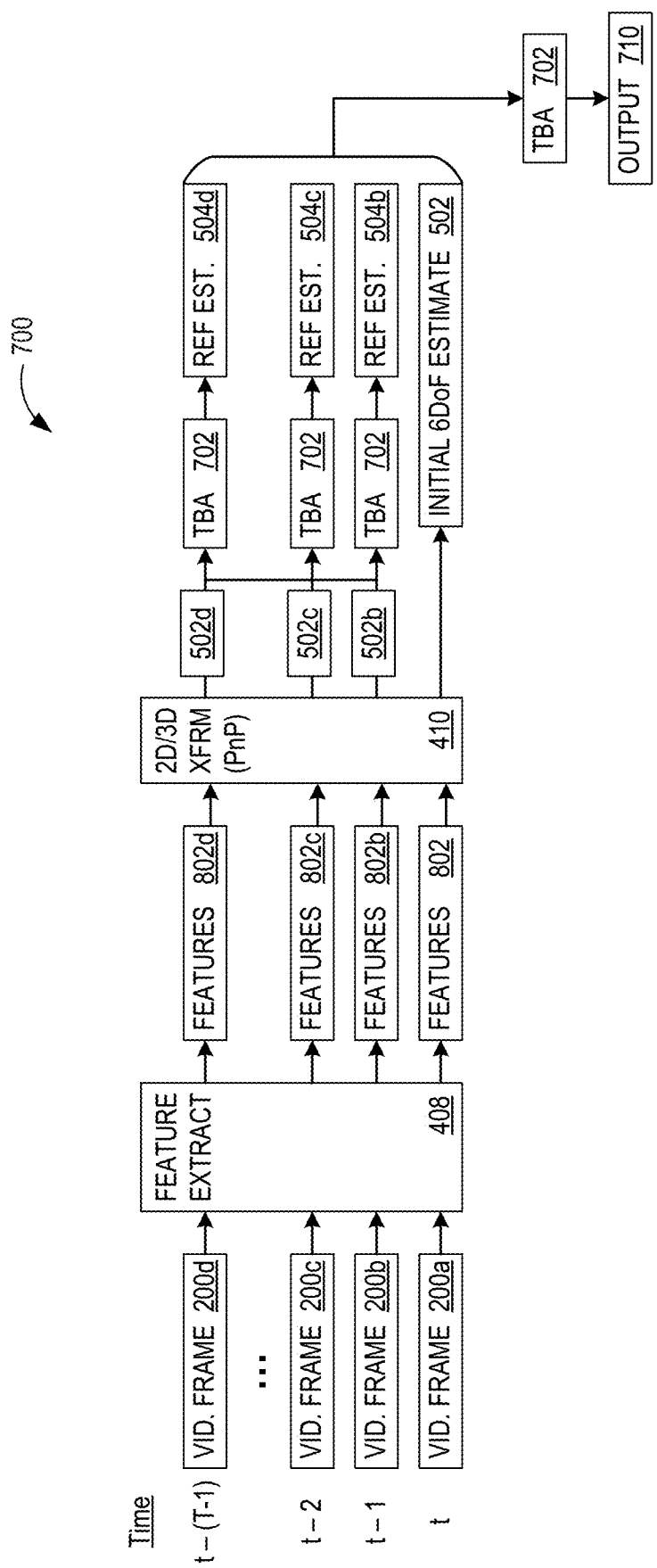
FIG. 7 illustrates an optimizer estimate refiner 700 for temporal refinement.
Figure 9:
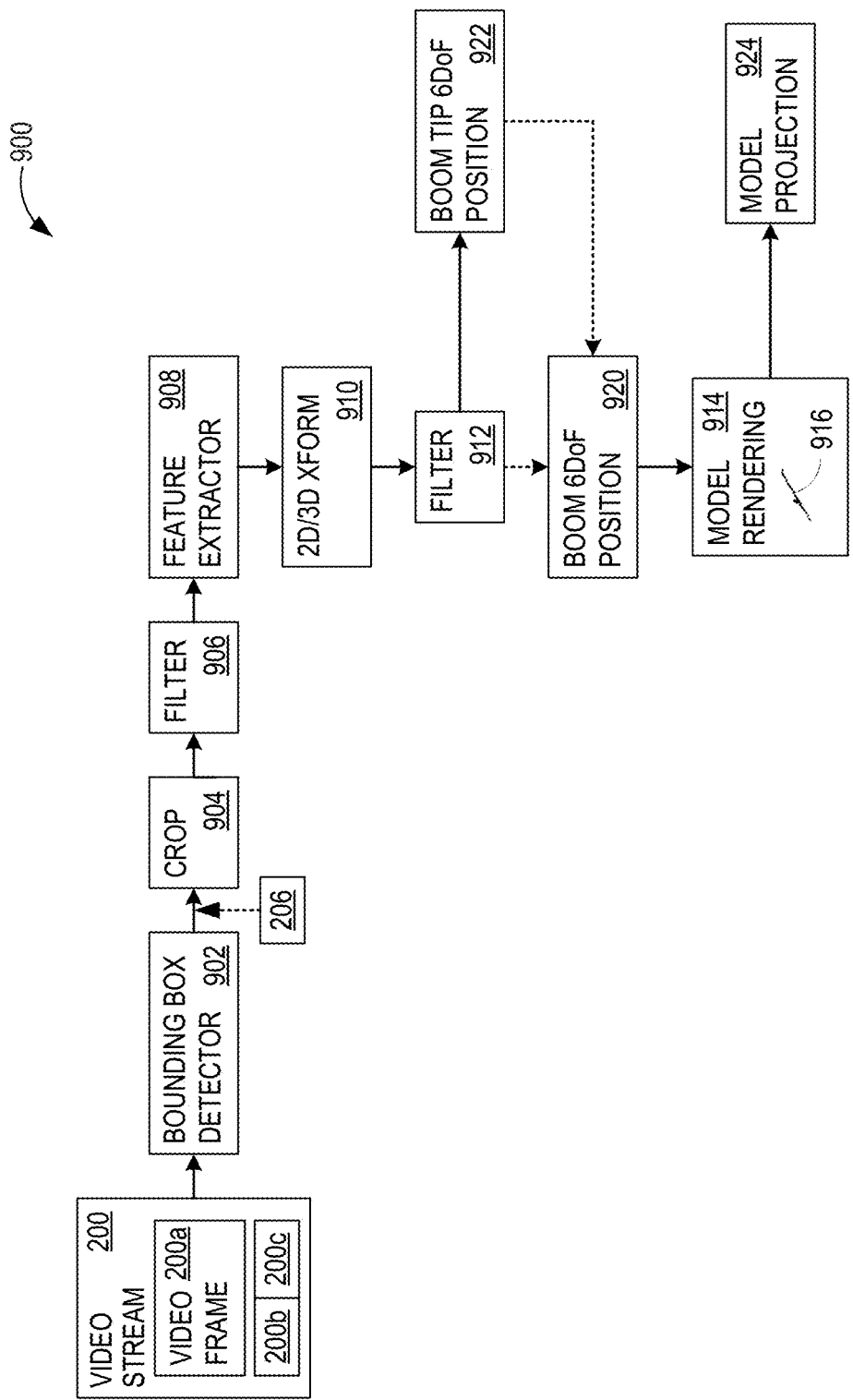
FIG. 9 illustrates a block diagram of a boom tip pose estimation pipeline 900, in accordance with an example.

The architecture 300 includes an aircraft pose estimation pipeline 400, which is shown and described in further detail in relation to FIGS. 4, 6, and 7, and a boom tip pose estimation pipeline 900, which is shown and described in further detail in relation to FIG. 9. The aircraft pose estimation pipeline 400 outputs a fuel receptacle position 422 (a 3D position and 3D orientation of a fuel receptacle on the aircraft 110), for example, in 6DoF. In some examples, the aircraft pose estimation pipeline 400 also outputs an aircraft model projection 424. The boom tip pose estimation pipeline 900 outputs a boom tip position 922 (a 3D position and 3D orientation of a boom tip), for example, in 6DoF. In some examples, the boom tip pose estimation pipeline 900 also outputs a boom model projection 924. The fuel receptacle position 422 and the boom tip position 922 are provided to a tracking logic 302 that determines a distance 304 between the boom tip 106 and the fuel receptacle 116 (which are both shown in FIG. 2B).

The tracking logic 302 determines boom control parameters 308, which are provided to a boom control 310 that autonomously moves the aerial refueling boom 104 to position the boom tip 106 to engage the fuel receptacle 116. That is, boom control 310 controls the aerial refueling boom 104 to engage the fuel receptacle 116. In some examples, the tracking logic 302 also determines whether controlling the aerial refueling boom 104 to engage the fuel receptacle 116 is within safety parameters 306, and if not, generates an alert 316. Boom control parameters 308, as used herein include variables that describe how the aerial refueling boom 104 can move (e.g., roll, pitch, yaw, translate, telescope, extend, retract, pivot, rotate, and the like) and may include limits and rates of such movement. Boom control parameters 308 may control the aerial refueling boom 104 given constraints of the boom pivot position and camera intrinsic and extrinsic parameters, for example, how to rotate the aerial refueling boom 104 (roll and pitch) and telescopically extend the aerial refueling boom 104.

In some examples, the aircraft model projection 424 and/or the boom model projection 924 are provided to a video compilation 312 that overlays the aircraft model projection 424 and/or the boom model projection 924 onto the video frame 200a to produce an overlay image 320. In some examples, the overlay image 320 and/or the alert 316 are provided to a human operator 314 over presentation components 1206 (e.g., by displaying the overlay image 320 on a video monitor screen). In some examples, the human operator 314 uses input/output (I/O) components 1210 (e.g., a joystick, mouse, keyboard, touchscreen, keypad, and/or other input devices) to provide boom control parameters 308 to control the aerial refueling boom 104 to position the boom tip 106 to engage the fuel receptacle 116.

FIG. 4 illustrates a block diagram of the aircraft pose estimation pipeline 400, which comprises a portion of the architecture 300. The video frame 200a is provided to an aircraft bounding box detector 402 that determines the aircraft bounding box 210. In some examples, the aircraft bounding box detector 402 comprises an NN, for example a deep CNN. In some examples, the aircraft bounding box detector 402 crops the video frame 200a to the area corresponding to the aircraft bounding box 210, to produce a cropped image 404. With cropping, later stages may neglect unnecessary sections of the video frame 200a by taking only the contents of the enclosing rectangle as input. Using just the area of interest also helps decrease computational time and allows use of more computationally intensive algorithms in later stages of the aircraft pose estimation pipeline 400.

In some examples, a filter 406 filters the video data, for example using a Kalman filter. Kalman filtering uses a series of measurements observed over time, containing noise and other inaccuracies, and produces estimates of unknown variables that tend to be more accurate than those based on a single measurement alone, by estimating a joint probability distribution over the variables for each timeframe. Thus, in some examples, the filter 406 operates across video frames (e.g., the plurality of video frames 200a-200c).

Figure 8B:
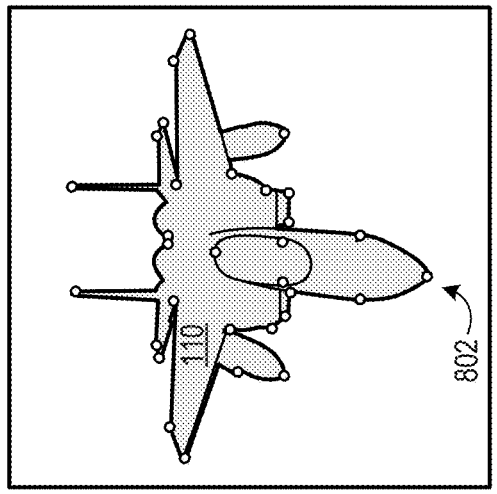
FIGS. 8A and 8B illustrate notional feature extraction results, in accordance with an example.
Figure 8A:
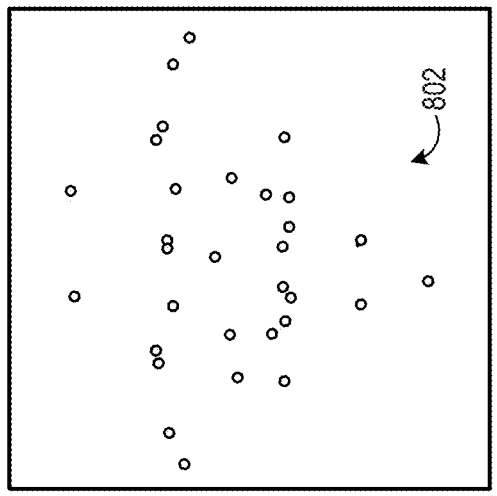

The output of the filter 406 is provided to an aircraft feature extractor 408, which outputs aircraft features 802 (shown in FIGS. 8A and 8B). In some examples, the aircraft feature extractor 408 comprises a keypoint detector, which may be implemented using an NN, for example a ResNet. Keypoint detection identifies the locations in video frames of points on a 3D object which may be used for 6DoF position estimation. Keypoints may be chosen as consistently recognizable locations on the 3D object such as wingtips or a nose of an aircraft.

The aircraft features 802 are provided to an aircraft two-dimensional (2D) to 3D transform 410. In some examples, the aircraft 2D to 3D transform 410 uses a perspective-n-point (PnP) algorithm. PnP algorithms estimate the pose (e.g., 6DoF position) of a calibrated camera relative to an object, given a set of N 3D points on the object and their corresponding 2D projections in an image collected by the camera. In some examples, the PnP algorithm leverages the correspondences between the 2D pixel locations of detected keypoints (aircraft features 802) and 3D keypoint locations on a 3D aircraft model 416, such that a simulated camera's view of the 3D keypoints on the aircraft model 416 match the 2D pixel locations of detected keypoints.

The aircraft 2D to 3D transform 410 uses the known angles, extrinsics, and geometry of an object at each time instance to capture its world position. Camera parameter information is used, which includes the parameters used in a camera model to describe the mathematical relationship between the 3D coordinates of a point in the scene from which the light comes and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

The aircraft 2D to 3D transform 410 determines a raw aircraft position that is filtered by a filter 412 to produce an initial position estimate 502 (represented by dashed lines in FIGS. 5A-5E), for example in 6DoF. The initial position estimate 502 in 6DoF is a combination of an initial 3D position estimate and an initial 3D orientation estimate for the aircraft 110 (e.g., together, the pose of the aircraft 110).

The initial position estimate 502 for the video frame 200a is added to a set of initial position estimates for other video frames in the video stream (e.g., initial position estimate 502b, initial position estimate 502c, and initial position estimate 502d), producing an estimated flight history 418 for the aircraft 110. An estimate refiner 430 determines a temporally consistent refined position estimate 504 for the aircraft 110, based on at least the estimated flight history 418 for the aircraft 110. The estimate refiner 430 produces refined position estimate 504 by comparing the estimated flight history 418 with known aircraft flight path trajectories for refueling aircraft (as viewed by the refueling platform 102) in aerial refueling settings.

Multiple potential architectures exist for the estimate refiner 430, including an NN estimate refiner 600, based on a deep learning NN and shown in FIG. 6, and an optimizer estimate refiner 700, shown in FIG. 7. That is, some examples of the estimate refiner 430 are implemented using the NN estimate refiner 600, and some examples of the estimate refiner 430 are implemented using the optimizer estimate refiner 700. In an example implementation, starting with initial position estimates having a 2.3 inch root mean squared error (RMSE) between the actual and estimated fuel receptacle position, the NN estimate refiner 600 improved the RMSE to approximately 1.83 inches, and the optimizer estimate refiner 700 improved the RMSE to approximately 1.76 inches.

In some examples, the estimate refiner 430 does not output the refined position estimate 504 directly, but instead outputs refinement parameters 440 (shifts ΔT and ΔR) that are used to calculate the refined position estimate 504 using Equations 1 and 2. The output refinement parameters 440 include a translation refinement 442 and a rotational refinement 444. The refined position estimate 504 is determined by applying the refinement parameters 440 to the initial position estimate 502 as indicated in Equation 1 for translation refinement and Equation 2 for rotational refinement:

$$T_{refined} = T_{estimate} + \Delta T \qquad \text{Equation 1}$$

$$R_{refined} = \Delta R * R_{estimate} \qquad \text{Equation 2}$$

where $T_{estimate}$ is the 3D position portion of the initial position estimate 502, $R_{estimate}$ is the 3D orientation portion of the initial position estimate 502, $\Delta T$ is the translation refinement 442, $\Delta R$ is the rotational refinement 444, $T_{refined}$ is the translational 3D position portion of the refined position estimate 504, and $R_{refined}$ is the rotational 3D position portion of the refined position estimate 504.

The fuel receptacle position 422 in 6DoF may be determined from the aircraft position 420 in 6DoF. That is, once the aircraft position 420 is known, the fuel receptacle position 422, which is in a predetermined location on the aircraft 110, can be determined. In some examples, the aircraft position 420 and/or the fuel receptacle position 422 is further filtered with a Kalman filter (which filters in time across video frames).

The aircraft model projection 424 may be generated by rendering the aircraft model 416 with a model rendering component 414, according to the refined position estimate 504. The aircraft model projection 424 is suitable for overlaying with another image (e.g., from the video frame 200a), such that the portion of the other image that is not obscured by the aircraft model rendering is still visible in the overlay image. In some examples, the refined position estimate 504 may be fed back into the estimated flight history 418.

Figure 5B:
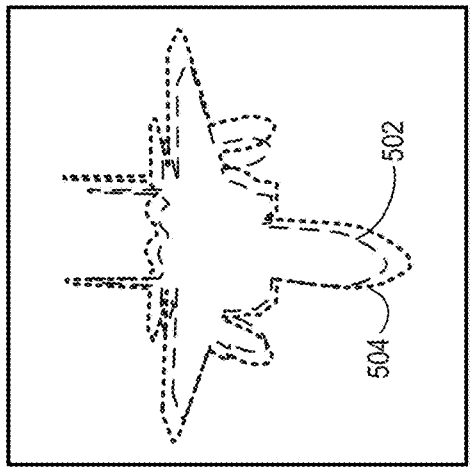
FIGS. 5A, 5B, and 5C illustrate translation and rotation for pose estimation refinement, in accordance with an example.
Figure 5C:
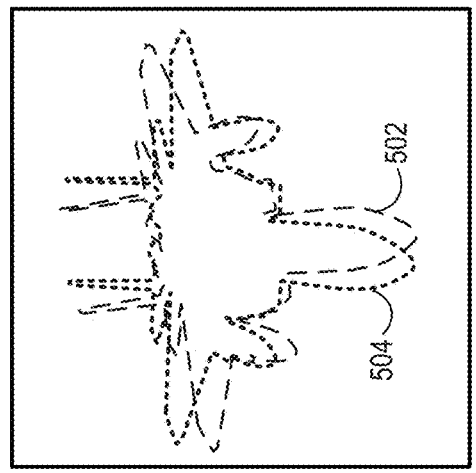
Figure 5A:
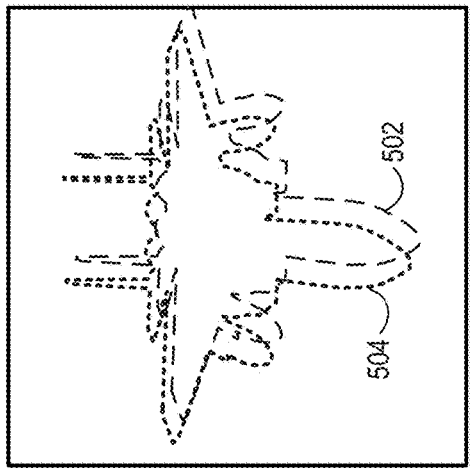
Figure 5D:
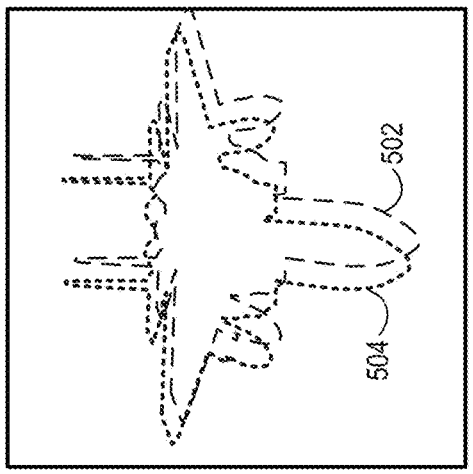
FIGS. 5D, 5E, and 5F illustrate pose estimation refinement, in accordance with an example.
Figure 5E:
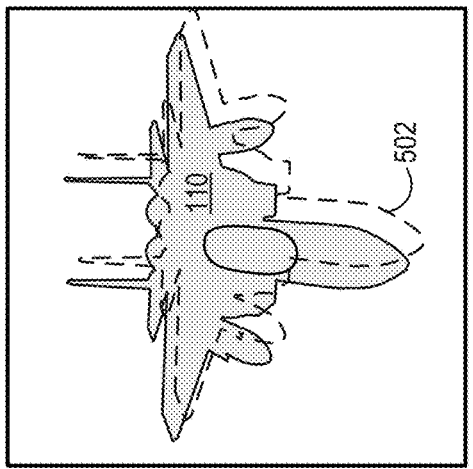
Figure 5F:
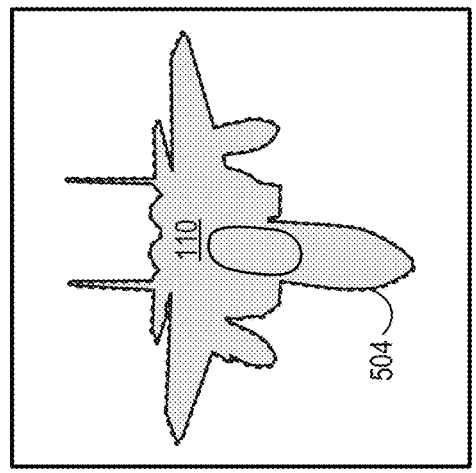

FIG. 5A illustrates translation refinement in 2D space, corresponding to x-y-image space, in which the refined position estimate 504 is shifted laterally relative to the initial position estimate 502. In some examples, the translation refinement is 3D, which is in the z-axis direction (when the 2D image space corresponds to x-y axes and z is the depth relative to the camera view). This results in scaling in the image space of the initial position estimate 502 into the size of the refined position estimate 504 (as the position estimate moves closer to or further from the virtual camera in the rendering), and is shown in FIG. 5B. FIG. 5C illustrates rotational refinement, in which the refined position estimate 504 is rotated relative to the initial position estimate 502. It should be understood that rotational refinement is 3D rotation (roll, pitch, and yaw). FIG. 5D shows the aircraft 110 with the initial position estimate 502, FIG. 5E shows the initial position estimate 502 with the refined position estimate 504, and FIG. 5F shows the aircraft 110 with the refined position estimate 504.

FIG. 6 illustrates the NN estimate refiner 600, which is an optional implementation for the estimate refiner 430, and comprises an NN 602 (e.g., a deep learning NN). The NN 602 intakes the estimated flight history 418, which comprises initial position estimates 502, 502b, 502c, and 502d, for a history of length time index T. The initial position estimates 502 is the initial position estimate at time=t, the initial position estimates 502b is the initial position estimate at time=(t−1), the initial position estimates 502c is the initial position estimate at time=(t−2), and the initial position estimates 502d is the initial position estimate at time=(t−(T−1)). Some examples use T=6. The refined position estimate 504 is the refined position estimate at time=t.

The 6DoF initial position estimates 502, 502b, 502c, and 502d comprise 3D position estimates and 3D orientation estimates, represented by x, y, z, r, p, yw, where x, y, and z are the positional parameters and r (roll), p (pitch), and yw (yaw) are the orientation (pose) parameters. The NN 602 outputs the refinement parameters 440, which are user to determine the refined position estimate 504, although some examples of the NN 602 may output the refined position estimate 504 directly. The refined position estimate 504 comprises the refined parameters x', y', z', r', p', yw'. In some examples, the NN 602 initially outputs ΔR as a rotation quaternion $\Delta R_q$, which is converted to a rotation matrix using extrinsic coordinates.

Because the NN 602 requires training on realistic aircraft flight path trajectories (flight profiles), training data 606 is generated from known aircraft flight path trajectories. A flight model 608 models the flight kinematics of various receiver aircraft platforms, providing ground truth data. Random noise 609 adds a random positional offset and random noise to each of the 6DoF position parameters. The trainer 604, uses the training data 606, which has flight positions (from the flight model 608) perturbed by the noise 609, and the ground truth parameters (proper aircraft position, also from the flight model 608).

In some examples, training-time augmentations to the flight profiles are made to add robustness to the training. A first noise component, shown in Equation 3, is added to the 6DoF aircraft position (e.g., initially, the ground truth position).

$n_1 \in \mathbb{R}^{1 \times 6}$ $n_1 \sim \mathcal{N}(0,\Sigma)$ $\Sigma = \text{diag}(c,c,c,0,0,0)$      Equation 3

This adds a Gaussian random positional offset with variance c.

A second noise component, shown in Equation 4, adds Gaussian random noise to each of the 6DoF position parameters.

$n_1 \in \mathbb{R}^{T \times 6}$ $n_1 \sim \mathcal{N}(0,\Sigma)$ $\Sigma = \text{diag}(\sigma_x,\sigma_y,\sigma_z,\sigma_r,\sigma_p,\sigma_{yw})$      Equation 4

In some examples, the variance of each component is selectable. In an example, the variances correspond to the error associated with estimating each parameter of the initial position estimation 502 for each video frame. In examples using T=6, for training, the input is a T×6 array for the six position parameters for each of the T video frames. The dataset is normalized to have zero mean and unit variance. In some examples, the loss function used is the mean squared error (MSE) between the input 6DoF parameters at the current time t and the ground truth parameters.

Options exist for implementing the NN 602, including versions based on a multi-layer perception (MLP), CNN, and a long-short term memory (LSTM) network. These are shown as implementation 610, implementation 620, and implementation 630, respectively. The implementation 610 takes an input 640 (e.g., the flight history 418) and passes it through a flattening component 612. The T×6-dimensional input is processed into a hidden layer of 100 neurons at MLP 614, and then a final ensemble of six MLPs 616 regresses a refined output 618.

The implementation 620 takes the input 640 and passes it through a CNN 622, where a one-dimensional (1D) CNN takes the correlation of each of the six position parameters across time to an activation shape of (T−1)×60, which goes through an MLP 624 to a hidden layer of 50 neurons before going to an ensemble of MLPs 626 to produce a refined output 628. The implementation 630 takes the input 640 and passes it through a long-short term memory (LSTM) network 632. An MLP 634 and an ensemble of MLPs 636 are similar to the MLP 624 and the ensemble of MLPs 626, although with slightly different parameters, and produce a refined output 638.

FIG. 7 illustrates the optimizer estimate refiner 700, which is another optional implementation for the estimate refiner 430. The optimizer estimate refiner 700 uses temporal bundle adjustment (TBA). Bundle adjustment minimizes a reprojection error between the image locations of observed and predicted image points, expressed as the sum of squares of a quantity of nonlinear, real-valued functions. Bundle adjustment jointly refines a set of initial camera and structure parameter estimates for finding the set of parameters that most accurately predict the locations of the observed points in the set of available images.

Each video frame 200a-200d is provided to the aircraft feature extractor 408 to extract aircraft features (e.g., keypoints), for example, the aircraft features 802 for the video frame 200a, aircraft features 802b for the video frame 200b, aircraft features 802c for the video frame 200c, and aircraft features 802d for a video frame 200d. In some examples, the aircraft feature extractor 408 comprises a CNN that detects 2D pixel values for keypoints on image of the aircraft 110 in the video frames of the video stream 200. The aircraft 2D to 3D transform 410 (e.g., a PnP algorithm) obtains initial 6DoF position estimates, including the initial position estimate 502 (as described above in relation to FIG. 4) for the current (most recent) video frame 200a at time t.

The initial position estimates for the prior frames 200b-200d (e.g., initial position estimate 502b, initial position estimate 502c, and initial position estimate 502d) had each previously been determined. The initial position estimates for the prior frames 200b-200d had each previously been refined into a refined position estimate 504b, a refined position estimate 504c, and a refined position estimate 504d, respectively, using a TBA 702.

For the current video frame 200a at time t, the initial position estimate 502 is used with the refined position estimates 504b-502d as an initial guess to solve the minimization objective of the TBA 702. This produces an output 710, which may be the refinement parameters 440 or the refined position estimate 504. An example TBA 702 implementation uses the optimization objective shown in Equation 5.

$$\min_{R,\,T} \lambda_r \sum_{t=1}^{T} \sum_{k=1}^{K} c_k \rho\left(x_k^{(t)} - P\left(V\left(R^{(t)} X_k^{(t)} + T^{(t)}\right)\right)\right) + \\ \sum_{t=1}^{T} \sum_{k=1}^{K} \left[\lambda_1 \rho\left(P\left(V\left(R^{(t)} X_k^{(t)} + T^{(t)}\right)\right) - P\left(V\left(R^{(t-1)} X_k^{(t-1)} + T^{(t-1)}\right)\right)\right) + \lambda_2 \rho\left(\left(R^{(t)} X_k^{(t)} + T^{(t)}\right) - \left(R^{(t-1)} X_k^{(t-1)} + T^{(t-1)}\right)\right)\right]$$

Eq. 5 where R is the rotation matrix; T (tau) is the translation matrix; $\lambda_r$, $\lambda_1$, and $\lambda_2$ are the regularization hyperparameters for the temporal-based optimization objective function; T is the number of video frames used; K is the number of keypoints from the PnP algorithm (e.g., a count of the aircraft features 802); c is the keypoint confidence; $\rho$ is the Huber error function; x is the 2D keypoint location in image space; X is the 3D keypoint location; P is the projection operation from camera space to image coordinates; and V is the coordinate transform from the world space (centered relative to the refueling platform 102) to the camera space.

The top line of Equation 5 is the sum over the PnP reprojection losses for the current window of T frames, weighted by the keypoint confidence values c. The second and third lines of Equation 5 form the temporal bundle adjustment (TBA) portion of the optimization objective. It has two terms. The first term, on the second line of Equation 5 minimizes the distances between the PnP reprojections between each frame and its previous frame in a time window. The second term, on the third line of Equation 5 minimizes the distances between the 3D keypoints in world space, after being transformed by the current 6DoF position estimate, between each frame and its previous frame in a time window. These two terms optimize for a set of 6DoF parameters that will reduce the displacement of keypoints, in both 2D and 3D, from frame to frame, while maintaining the shape and geometry of the keypoints. The regularizing hyperparameters for the optimization balance the weight of each of the optimization objectives so that each objective contributes towards the search for the solution of 6DoF parameters.

FIG. 8A shows the aircraft 110 with the extracted keypoints, or aircraft features 802 (white-filled circles), for the aircraft 110, extracted from the video frame 200a (or another video frame of the video stream 200). For clarity, the aircraft features 802 are shown without the aircraft 110, in FIG. 8B.

FIG. 9 illustrates a block diagram of a boom tip pose estimation pipeline 900. The video frame 200a is provided to a boom tip bounding box detector 902 that determines the boom tip bounding box 206. In some examples, the boom tip bounding box detector 902 crops the video frame 200a to the area corresponding to the boom tip bounding box 206, to produce a cropped image 904. In some examples, a filter 906 filters the video data, for example using a Kalman filter operating across video frames (e.g., the video frame 200a and the plurality of additional video frames 200b).

In some examples, the boom tip bounding box detector 902 comprises an NN, for example a deep CNN. The output of the boom tip bounding box detector 902 (cropped and/or filtered, in some examples), is provided to a boom tip feature extractor 908. In some examples, the boom tip feature extractor 908 comprises a keypoint detector implemented using an NN, for example a ResNet. The boom tip feature extractor 908 outputs a boom tip feature map that is provided to a boom tip 2D to 3D transform 910. The boom tip 2D to 3D transform 910 determines the boom tip position 922, for example, in 6DoF, which, in some examples, is filtered with a filter 912.

In some examples, the boom tip 2D to 3D transform 910 also determines boom position 920, which is the position of the aerial refueling boom 104 in 6DoF. In some examples, boom position 920 is determined using the boom tip position 922 (for the distal end of the aerial refueling boom 104) and the knowledge that the proximal end of the aerial refueling boom 104 is located at a fixed position on the refueling platform 102. The boom model projection 924 is generated by rendering a 3D refueling boom model 916 with a model rendering component 914, according to the boom position 920.

Figure 10:
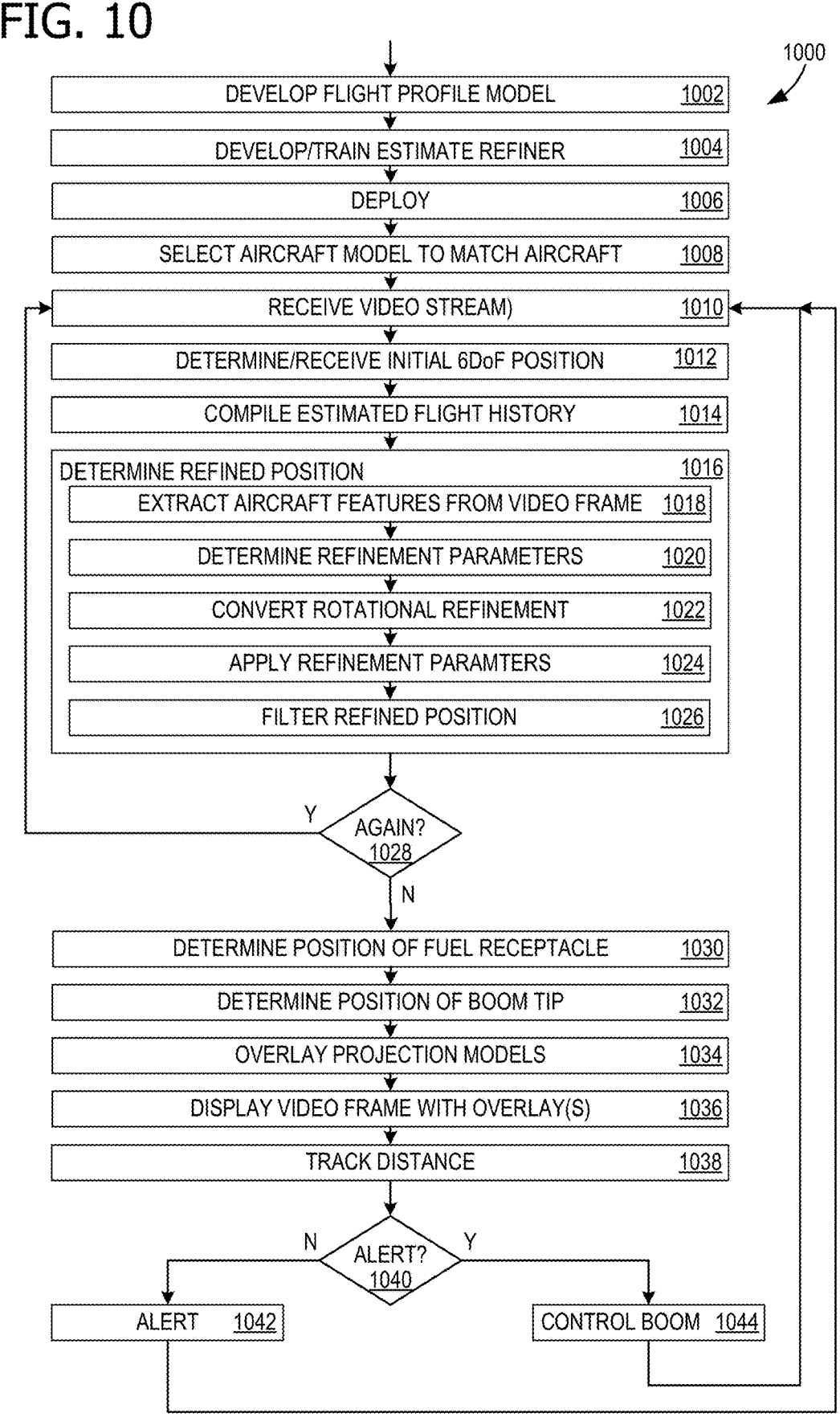
FIG. 10 is a flowchart 1000 illustrating a method of pose estimation for aerial refueling, as can be used with the arrangement 100 of FIG. 1, in accordance with an example.

With reference now to FIG. 10, a flowchart 1000 illustrates a method of aerial refueling (for example, a method of pose estimation for aerial refueling). In some examples, the operations illustrated in FIG. 10 are performed, at least in part, by executing instructions 1202a (stored in the memory 1202) by the one or more processors 1204 of the computing device 1200 of FIG. 12. For example, the estimate refiner 430 may be developed (e.g., trained) and validated on a first example of the computing device 1200 and then deployed on a second (different) example of the computing device 1200 located on the refueling platform 102. Operations 1002 and 1004 are performed prior to deployment in operation 1006.

A flight profile model, based on aircraft flight path trajectories that are observed during aerial refueling operations, is developed in operation 1002. In some examples, this includes receive simulated and/or measured real flight profile information. The estimate refiner 430 is developed or trained in operation 1004. In some examples, Operation 1004 includes generating the training data 606 for the NN 602 using a simulator that simulates flight path trajectories in an aerial refueling setting to produce a set of aircraft positions and aircraft ground truth data, labeling the aircraft positions using the aircraft ground truth data, and training the NN 602 with the trainer 604, using the training data 606. The estimate refiner 430 is deployed in operation 1006.

Operation 1008 includes selecting the aircraft model 416 based on at least the aircraft 110 to be refueled. This may leverage refueling scheduling information, user input, or automatic object recognition of the aircraft 110. In some examples, the aircraft model 416 comprises a 3D triangular mesh model. Operation 1010 includes receiving the video stream 200 comprising the video frame 200a (and additional video frames 200b and 200c of the plurality of video frames 200a-200c), which show the aircraft 110 to be refueled. In some examples, the video stream 200 is provided by a single camera (e.g., the camera 108). In some examples, the video stream 200 is monocular.

Operation 1012 includes determining, for each video frame of the plurality of video frames 200a-200c, an initial position estimate 502 for the aircraft 110 (or initial position estimate 502b, 502c, . . . ). The initial position estimates 502-502d) for the plurality of video frames are compiled into the estimated flight history 418 for the aircraft 110, in operation 1014. In some examples, each initial position estimate comprises a 6DoF position estimate (e.g., a 3D position estimate and a 3D orientation estimate).

Operation 1016, which is performed using operations 1018-1026 9 at least some of which are performed by the estimate refiner 430), determines the temporally consistent refined position estimate 504 for the aircraft 110, based on at least the estimated flight history 418 for the aircraft 110. The estimate refiner 430 refines the estimated flight history 418 in accordance with known aircraft flight path trajectories. In some examples, the refined position estimate 504 comprises a 6DoF position estimate. In some examples, the estimate refiner comprises the NN 602. In some examples, the estimate refiner 430 comprises an optimizer, which employs bundle adjustment. Operation 1018 extracts keypoints (the aircraft features 802) from the video stream 200 (e.g., from the video frame 200a) using the aircraft feature extractor 408 in the estimate refiner 430 (e.g., the optimizer estimate refiner 700). In some examples, the aircraft feature extractor 408 comprises an NN, for example, a CNN.

Operation 1020 uses the estimate refiner 430 to determine the refinement parameters 440 (position estimation refinement parameters), based on at least the estimated flight history 418 for the aircraft 110. In some examples, the refinement parameters 440 comprise a translation refinement 442 and a rotational refinement 444. Some examples of arrangement 100 are able to determine the refinement parameters 440 even when a portion of the aircraft 110 is not visible within the video frame 200a. Operation 1022 converts the rotational refinement 444 from a rotation quaternion to a rotation matrix, and operation 1024 applies the refinement parameters 440 to the initial position estimate 502 in the estimated flight history 418 to produce the (temporally consistent) refined position estimate 504. Operation 1026 filters the refined position estimate 504, in some examples, using a Kalman filter.

A decision operation 1028 determines whether to pass through operations 1010-1026 again, or whether the desired count of iterations has already been reached. This process iteratively generates successively refined position estimates 504 prior to determining the fuel receptacle position 422.

When the flowchart 1000 continues, operation 1030 includes, based on at least the refined position estimate 504 for the aircraft 110, determining the fuel receptacle position 422 on the aircraft 110. Operation 1032 determines the position of the boom tip 106 (e.g., the boom tip position 922 in 6DoF) of the aerial refueling boom 104. Operation 1034 generates the overlay image 320. The overlay image 320 comprises the aircraft model projection 424, which is based on at least the aircraft model 416 and the refined position estimate 504, and the video frame 200a showing the aircraft 110 or a subsequent video frame showing the aircraft 110. In some examples, the overlay image 320 also comprises the boom model projection 924, which is based on at least the refueling boom model 916 and the boom tip position 922. The overlay image 320 is displayed in operation 1036.

Operation 1038 tracks the distance 304 between the boom tip 106 and the fuel receptacle 116. A decision operation 1040 determines whether controlling the aerial refueling boom 104 to engage the fuel receptacle 116 is within the safety parameters 306, based on at least the fuel receptacle position 422 and the boom tip position 922. If not within the safety parameters 306, operation 1042 includes, based on at least determining that controlling the aerial refueling boom 104 to engage the fuel receptacle 116 is not within safety parameters 306, generating the alert 316.

Otherwise, operation 1044 includes, based on at least the fuel receptacle position 422, controlling the aerial refueling boom 104 to engage the fuel receptacle 116. Controlling the aerial refueling boom 104 to engage the fuel receptacle 116 comprises controlling the aerial refueling boom 104 to engage the fuel receptacle 116 based on at least the fuel receptacle position 422 and the boom tip position 922. The flowchart 1000 then returns to operation 1010.

Figure 11:
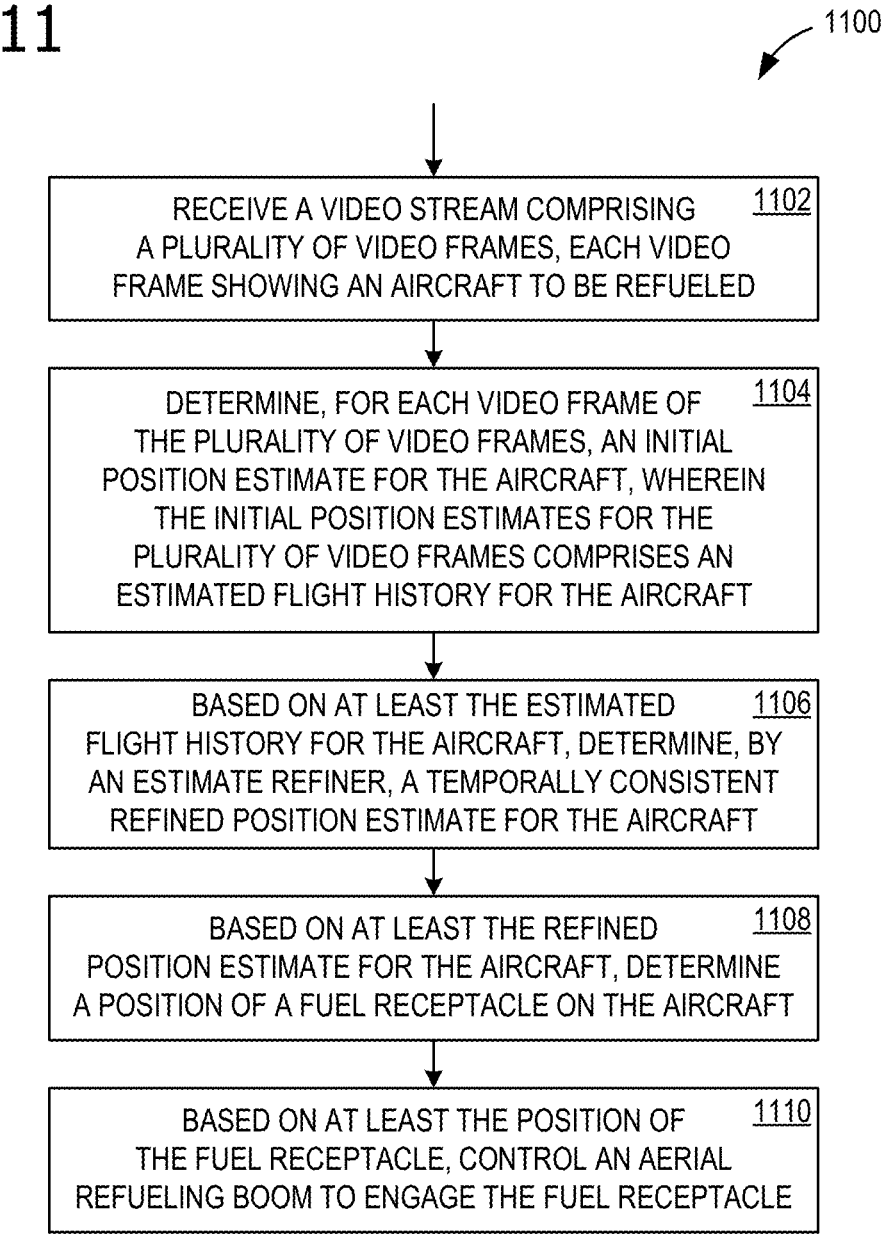
FIG. 11 is a flowchart 1100 illustrating another method of fuel receptacle and boom tip pose estimation for aerial refueling, as can be used with the arrangement 100 of FIG. 1, in accordance with an example.

FIG. 11 shows a flowchart 1100 illustrating a method of aerial refueling. In some examples, operations illustrated in FIG. 11 are performed, at least in part, by executing instructions by the one or more processors 1204 of the computing device 1200 of FIG. 12. Operation 1102 includes receiving a video stream comprising a plurality of video frames, each video frame showing an aircraft to be refueled. Operation 1104 includes determining, for each video frame of the plurality of video frames, an initial position estimate for the aircraft, wherein the initial position estimates for the plurality of video frames comprises an estimated flight history for the aircraft.

Operation 1106 includes, based on at least the estimated flight history for the aircraft, determining, by an estimate refiner, a temporally consistent refined position estimate for the aircraft. Operation 1108 includes based on at least the refined position estimate for the aircraft, determining a position of a fuel receptacle on the aircraft. Operation 1110 includes, based on at least the position of the fuel receptacle, controlling an aerial refueling boom to engage the fuel receptacle.

Figure 12:
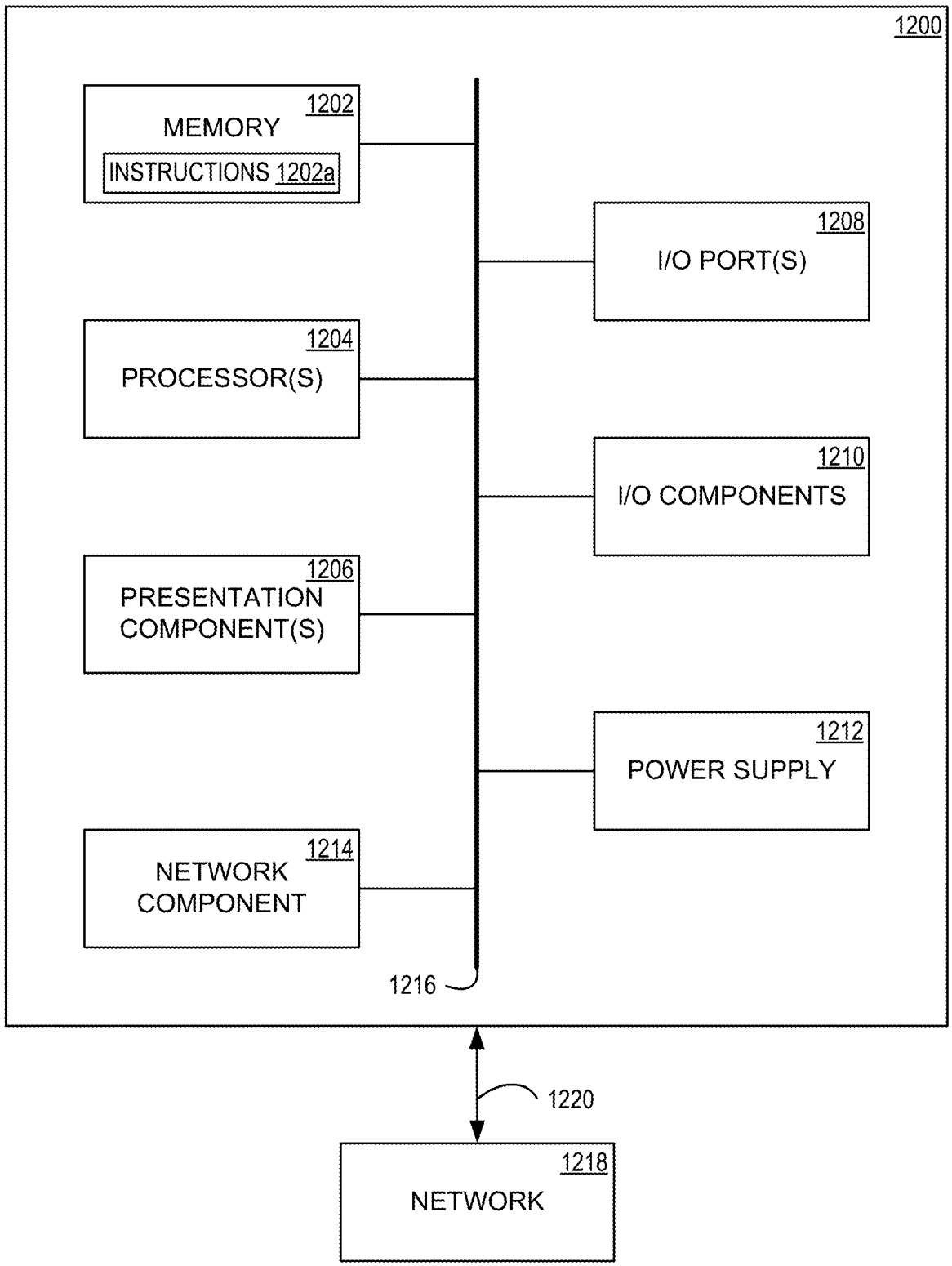
FIG. 12 is a block diagram of a computing device 1200 suitable for implementing various aspects of the disclosure in accordance with an example.

With reference now to FIG. 12, a block diagram of the computing device 1200 suitable for implementing various aspects of the disclosure is described. In some examples, the computing device 1200 includes one or more processors 1204, one or more presentation components 1206 and the memory 1202. The disclosed examples associated with the computing device 1200 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 12 and the references herein to a "computing device." The disclosed examples are also practiced in distributed computing environments, where tasks are performed by remote-processing devices that are linked through a communications network. Further, while the computing device 1200 is depicted as a seemingly single device, in one example, multiple computing devices work together and share the depicted device resources. For instance, in one example, the memory 1202 is distributed across multiple devices, the processor(s) 1204 provided are housed on different devices, and so on.

In one example, the memory 1202 includes any of the computer-readable media discussed herein. In one example, the memory 1202 is used to store and access instructions 1202a configured to carry out the various operations disclosed herein. In some examples, the memory 1202 includes computer storage media in the form of volatile and/or nonvolatile memory, removable or non-removable memory, data disks in virtual environments, or a combination thereof. In one example, the processor(s) 1204 includes any quantity of processing units that read data from various entities, such as the memory 1202 or input/output (I/O) components 1210. Specifically, the processor(s) 1204 are programmed to execute computer-executable instructions for implementing aspects of the disclosure. In one example, the instructions are performed by the processor, by multiple processors within the computing device 1200, or by a processor external to the computing device 1200. In some examples, the processor(s) 1204 are programmed to execute instructions such as those illustrated in the flowcharts discussed below and depicted in the accompanying drawings.

The presentation component(s) 1206 present data indications to an operator or to another device. In one example, presentation components 1206 include a display device, speaker, printing component, vibrating component, etc. One skilled in the art will understand and appreciate that computer data is presented in a number of ways, such as visually in a graphical user interface (GUI), audibly through speakers, wirelessly between the computing device 1200, across a wired connection, or in other ways. In one example, presentation component(s) 1206 are not used when processes and operations are sufficiently automated that a need for human interaction is lessened or not needed. I/O ports 1208 allow the computing device 1200 to be logically coupled to other devices including the I/O components 1210, some of which is built in. Implementations of the I/O components 1210 include, for example but without limitation, a microphone, keyboard, mouse, joystick, game pad, satellite dish, scanner, printer, wireless device, etc.

The computing device 1200 includes a bus 1216 that directly or indirectly couples the following devices: the memory 1202, the one or more processors 1204, the one or more presentation components 1206, the input/output (I/O) ports 1208, the I/O components 1210, a power supply 1212, and a network component 1214. The computing device 1200 should not be interpreted as having any dependency or requirement related to any single component or combination of components illustrated therein. The bus 1216 represents one or more busses (such as an address bus, data bus, or a combination thereof). Although the various blocks of FIG. 12 are shown with lines for the sake of clarity, some implementations blur functionality over various different components described herein.

In some examples, the computing device 1200 is communicatively coupled to a network 1218 using the network component 1214. In some examples, the network component 1214 includes a network interface card and/or computer-executable instructions (e.g., a driver) for operating the network interface card. In one example, communication between the computing device 1200 and other devices occur using any protocol or mechanism over a wired or wireless connection 1220. In some examples, the network component 1214 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1200, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 13:
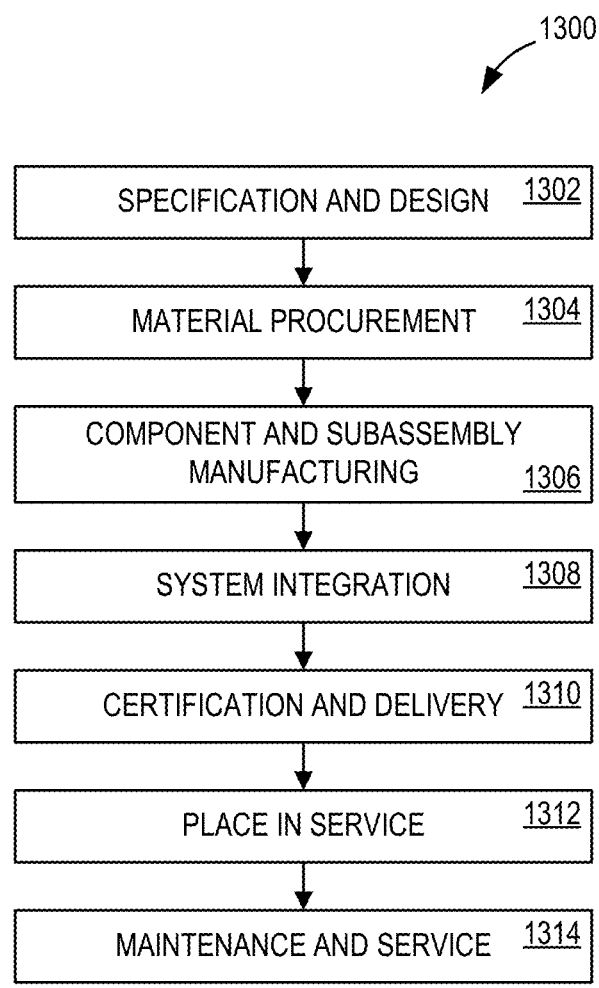
FIG. 13 is a block diagram of an apparatus production and service method 1300 that employs various aspects of the disclosure in accordance with an example.
Figure 14:
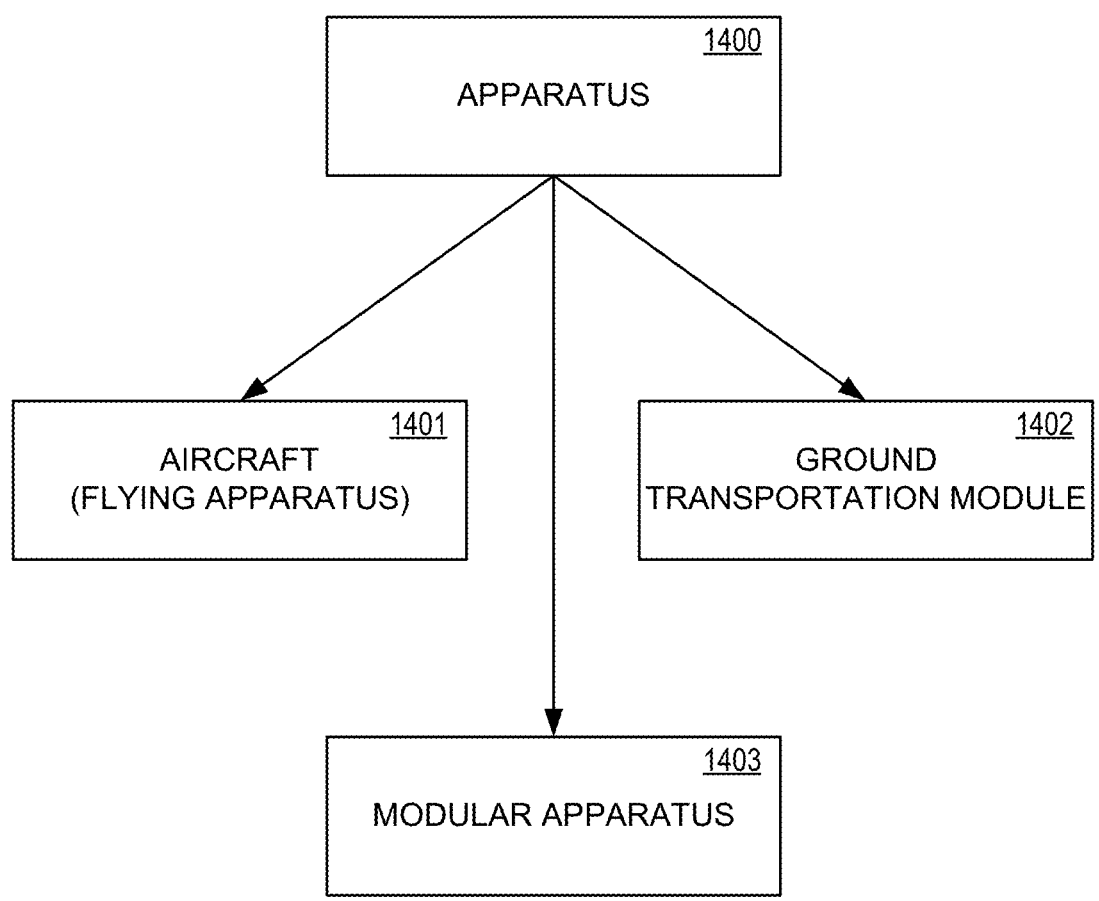
FIG. 14 is a block diagram of an apparatus 1400 for which various aspects of the disclosure may be advantageously employed in accordance with an example.
Figure 15:
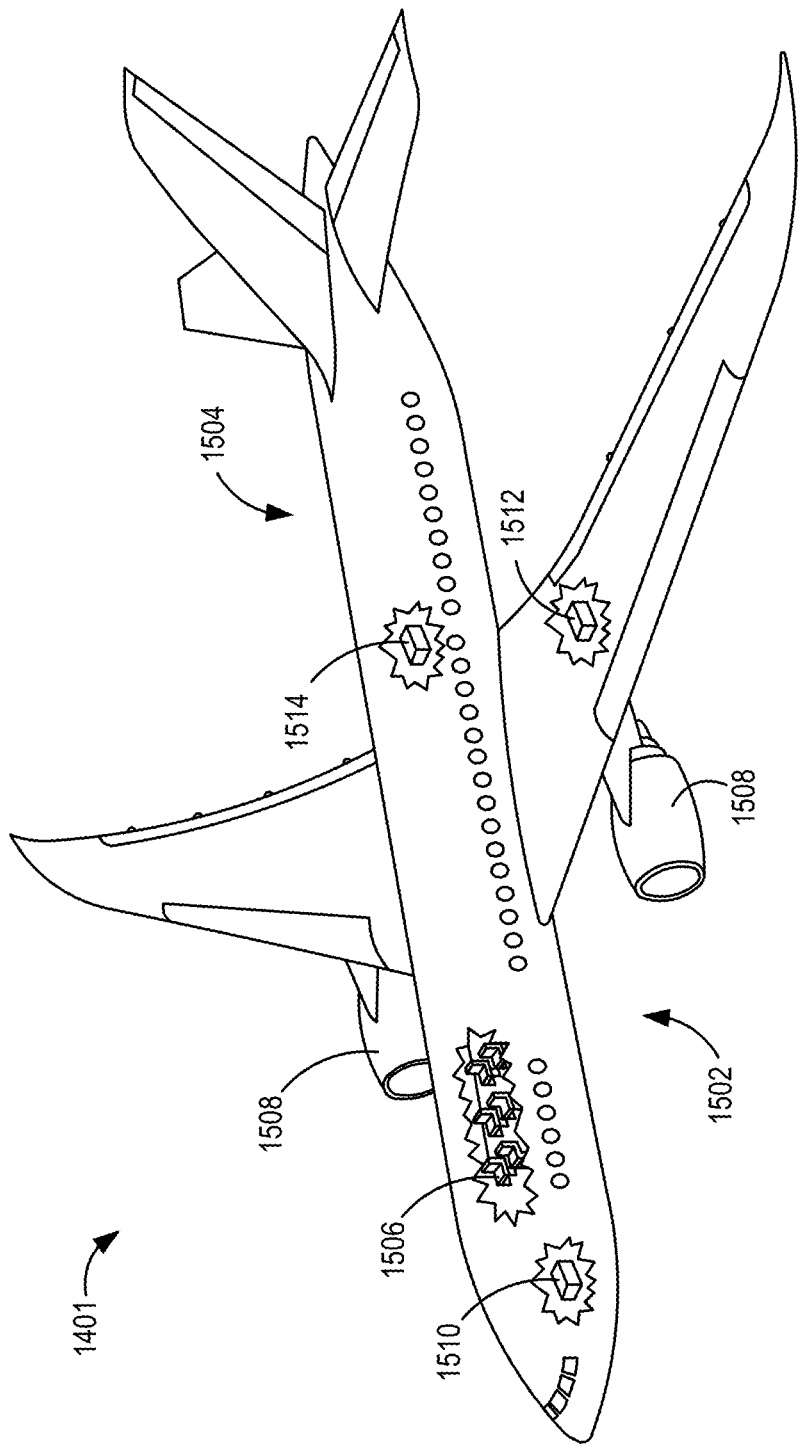
FIG. 15 is a schematic perspective view of a particular flying apparatus 1401 in accordance with an example.

Some examples of the disclosure are used in manufacturing and service applications as shown and described in relation to FIGS. 13-15. Thus, examples of the disclosure are described in the context of an apparatus of manufacturing and service method 1300 shown in FIG. 13 and apparatus 1400 shown in FIG. 14. In FIG. 14, a diagram illustrating an apparatus manufacturing and service method 1300 is depicted in accordance with an example. In one example, during pre-production, the apparatus manufacturing and service method 1300 includes specification and design 1302 of the apparatus 1400 in FIG. 14 and material procurement 1304. During production, component, and subassembly manufacturing 1306 and system integration 1308 of the apparatus 1400 in FIG. 14 takes place. Thereafter, the apparatus 1400 in FIG. 14 goes through certification and delivery 1310 in order to be placed in service 1312. While in service by a customer, the apparatus 1400 in FIG. 14 is scheduled for routine maintenance and service 1314, which, in one example, includes modification, reconfiguration, refurbishment, and other maintenance or service subject to configuration management, described herein.

In one example, each of the processes of the apparatus manufacturing and service method 1300 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 14, the apparatus 1400 is provided. As shown in FIG. 14, an example of the apparatus 1400 is a flying apparatus 1401, such as an aerospace vehicle, aircraft, air cargo, flying car, satellite, planetary probe, deep space probe, solar probe, and the like. As also shown in FIG. 14, a further example of the apparatus 1400 is a ground transportation apparatus 1402, such as an automobile, a truck, heavy equipment, construction equipment, a boat, a ship, a submarine, and the like. A further example of the apparatus 1400 shown in FIG. 14 is a modular apparatus 1403 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 15, a more specific diagram of the flying apparatus 1401 is depicted in which an implementation of the disclosure is advantageously employed. In this example, the flying apparatus 1401 is an aircraft produced by the apparatus manufacturing and service method 1300 in FIG. 13 and includes an airframe 1502 with a plurality of systems 1504 and an interior 1506. Examples of the plurality of systems 1504 include one or more of a propulsion system 1508, an electrical system 1510, a hydraulic system 1512, and an environmental system 1514. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of aerial refueling comprises: receiving a video stream comprising a plurality of video frames, each video frame showing an aircraft to be refueled; determining, for each video frame of the plurality of video frames, an initial position estimate for the aircraft, wherein the initial position estimates for the plurality of video frames comprises an estimated flight history for the aircraft; based on at least the estimated flight history for the aircraft, determining, by an estimate refiner, a temporally consistent refined position estimate for the aircraft; based on at least the refined position estimate for the aircraft, determining a position of a fuel receptacle on the aircraft; and based on at least the position of the fuel receptacle, controlling an aerial refueling boom to engage the fuel receptacle.

An example system for aerial refueling comprises: one or more processors; and a memory storing instructions that, when executed by the one or more processors, cause the one or more processors to perform operations comprising: receiving a video stream comprising a plurality of video frames, each video frame showing an aircraft to be refueled; determining, for each video frame of the plurality of video frames, an initial position estimate for the aircraft, wherein the initial position estimates for the plurality of video frames comprises an estimated flight history for the aircraft; based on at least the estimated flight history for the aircraft, determining, by an estimate refiner, a temporally consistent refined position estimate for the aircraft; based on at least the refined position estimate for the aircraft, determining a position of a fuel receptacle on the aircraft; and based on at least the position of the fuel receptacle, controlling an aerial refueling boom to engage the fuel receptacle.

An example computer program product comprises a computer usable medium having a computer readable program code embodied therein, the computer readable program code adapted to be executed to implement a method of aerial refueling, the method comprising: receiving a video stream comprising a plurality of video frames, each video frame showing an aircraft to be refueled; determining, for each video frame of the plurality of video frames, an initial position estimate for the aircraft, wherein the initial position estimates for the plurality of video frames comprises an estimated flight history for the aircraft; based on at least the estimated flight history for the aircraft, determining, by an estimate refiner, a temporally consistent refined position estimate for the aircraft; based on at least the refined position estimate for the aircraft, determining a position of a fuel receptacle on the aircraft; and based on at least the position of the fuel receptacle, controlling an aerial refueling boom to engage the fuel receptacle.

Alternatively, or in addition to the other examples described herein, examples include any combination of the following:

the video stream is provided by a single camera;
the video stream is monocular;
based on at least the estimated flight history for the aircraft, determining, by the estimate refiner, position estimation refinement parameters, wherein the refinement parameters comprise a translation refinement and a rotational refinement, and wherein determining the temporally consistent refined position estimate comprises determining the temporally consistent refined position estimate based on at least the estimated flight history and the position estimation refinement parameters;
the estimate refiner comprises a first NN;
the estimate refiner comprises an optimizer;
determining a position of a boom tip of the aerial refueling boom;
controlling the aerial refueling boom to engage the fuel receptacle comprises controlling the aerial refueling boom to engage the fuel receptacle based on at least the position of the fuel receptacle and the position of the boom tip;
generating an overlay image:
the overlay image comprises a model projection, based on at least an aircraft model and the refined position estimate;
the overlay image comprises the video frame showing the aircraft or a subsequent video frame showing the aircraft;
displaying the overlay image;
the estimate refiner refines the estimated flight history in accordance with known aircraft flight path trajectories;
a boom control that controls the aerial refueling boom to engage the fuel receptacle;
the estimate refiner further comprises a feature extractor;
the feature extractor extracts keypoints from the video stream;
the feature extractor comprises a second NN;
the second NN comprises a CNN;
the refined position estimate comprises a 6DoF position estimate;
each initial position estimate comprises a 6DoF position estimate;
converting the rotational refinement from a rotation quaternion to a rotation matrix;
the video stream is monocular;
filtering the refined position estimate;
filtering the refined position estimate with a Kalman filter;
iteratively generating refined position estimates prior to determining the position of the fuel receptacle;
selecting the aircraft model based on at least the aircraft to be refueled;
tracking a distance between the boom tip and the fuel receptacle;
based on at least the position of the fuel receptacle and the position of the boom tip, determining whether controlling the aerial refueling boom to engage the fuel receptacle is within safety parameters;
based on at least determining that controlling the aerial refueling boom to engage the fuel receptacle is not within safety parameters, generating an alert;
generating training data for the first NN using a simulator that simulates flight path trajectories in an aerial refueling setting to produce a set of aircraft positions and aircraft ground truth data;
labeling the aircraft positions using the aircraft ground truth data;
training the first NN using the training data; and
the optimizer employs bundle adjustment.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of aerial refueling, the method comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, a temporally consistent refined position estimate for the aircraft;
based on at least the refined position estimate for the aircraft, determining a position of a fuel receptacle on the aircraft;
determining a position of a boom tip of an aerial refueling boom, wherein the aerial refueling boom is telescopically extendable;
tracking a distance between the boom tip and the fuel receptacle; and
based on at least the position of the fuel receptacle and the position of the boom tip, controlling the aerial refueling boom, using boom control parameters, to engage the fuel receptacle, wherein the boom control parameters include a parameter for telescopically extending the aerial refueling boom.

2. The method of claim 1, wherein the video stream is provided by a single camera.

3. The method of claim 1, further comprising:
based on at least the estimated flight history for the aircraft, determining, by the estimate refiner, position estimation refinement parameters, wherein the refinement parameters comprise a translation refinement and a rotational refinement, and wherein determining the temporally consistent refined position estimate comprises determining the temporally consistent refined position estimate based on at least the estimated flight history and the position estimation refinement parameters.

4. The method of claim 1, wherein the estimate refiner comprises a first neural network (NN).

5. The method of claim 1, wherein the estimate refiner comprises an optimizer.

6. The method of claim 1, further comprising:
generating an overlay image comprising:
a model projection, based on at least an aircraft model and the refined position estimate; and
the video frame showing the aircraft or a subsequent video frame showing the aircraft; and
displaying the overlay image.

7. A system for aerial refueling, the system comprising:
one or more processors; and
a memory storing instructions that, when executed by the one or more processors, cause the one or more processors to perform operations comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, a temporally consistent refined position estimate for the aircraft;
based on at least the refined position estimate for the aircraft, determining a position of a fuel receptacle on the aircraft;
determining a position of a boom tip of an aerial refueling boom, wherein the aerial refueling boom is telescopically extendable;
tracking a distance between the boom tip and the fuel receptacle; and
based on at least the position of the fuel receptacle and the position of the boom tip, controlling the aerial refueling boom, using boom control parameters, to engage the fuel receptacle, wherein the boom control parameters include a parameter for telescopically extending the aerial refueling boom.

8. The system of claim 7, wherein the video frame is provided by a single camera.

9. The system of claim 7, wherein the operations further comprise:
based on at least the estimated flight history for the aircraft, determining, by the estimate refiner, position estimation refinement parameters, wherein the refinement parameters comprise a translation refinement and a rotational refinement, and wherein determining the temporally consistent refined position estimate comprises determining the temporally consistent refined position estimate based on at least the estimated flight history and the position estimation refinement parameters.

10. The system of claim 7, wherein the estimate refiner comprises a first neural network (NN).

11. The system of claim 7, wherein the estimate refiner comprises an optimizer.

12. The system of claim 7, further comprising:
a boom control, wherein the processor is to perform the operation of controlling the aerial refueling boom to engage the fuel receptacle via the boom control.

13. A computer program product, comprising a non-transitory computer usable medium having a computer readable program code embodied therein, the computer readable program code adapted to be executed to implement a method of aerial refueling, the method comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, a temporally consistent refined position estimate for the aircraft;
based on at least the refined position estimate for the aircraft, determining a position of a fuel receptacle on the aircraft;
determining a position of a boom tip of an aerial refueling boom, wherein the aerial refueling boom is telescopically extendable;
tracking a distance between the boom tip and the fuel receptacle; and
based on at least the position of the fuel receptacle and the position of the boom tip, controlling the aerial refueling boom, using boom control parameters, to engage the fuel receptacle, wherein the boom control parameters include a parameter for telescopically extending the aerial refueling boom.

14. The computer program product of claim 13, wherein the video frame is provided by a single camera.

15. The computer program product of claim 13, wherein the method further comprises:
based on at least the estimated flight history for the aircraft, determining, by the estimate refiner, position estimation refinement parameters, wherein the refinement parameters comprise a translation refinement and a rotational refinement, and wherein determining the temporally consistent refined position estimate comprises determining the temporally consistent refined position estimate based on at least the estimated flight history and the position estimation refinement parameters.

16. The computer program product of claim 13, wherein the estimate refiner comprises a first neural network (NN).

17. The computer program product of claim 13, wherein the estimate refiner comprises an optimizer.

18. The method of claim 1, wherein the estimate refiner produces the refined position estimate by comparing the estimated flight history with known aircraft flight path trajectories for refueling aircraft as viewed by a refueling platform.

19. The system of claim 7, wherein the estimate refiner produces the refined position estimate by comparing the estimated flight history with known aircraft flight path trajectories for refueling aircraft as viewed by a refueling platform.

20. The computer program product of claim 13, wherein the estimate refiner produces the refined position estimate by comparing the estimated flight history with known aircraft flight path trajectories for refueling aircraft as viewed by a refueling platform.

21. A method of aerial refueling, the method comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, position estimation refinement parameters, wherein the refinement parameters comprise a translation refinement and a rotational refinement;
based on at least the estimated flight history for the aircraft and the position estimation refinement parameters, determining, by the estimate refiner, a temporally consistent refined position estimate for the aircraft;
based on at least the refined position estimate for the aircraft, determining a position of a fuel receptacle on the aircraft; and
based on at least the position of the fuel receptacle, controlling an aerial refueling boom to engage the fuel receptacle.

22. The method of claim 21, wherein the video stream is provided by a single camera.

23. The method of claim 21, wherein the estimate refiner comprises a first neural network (NN).

24. The method of claim 21, wherein the estimate refiner comprises an optimizer.

25. The method of claim 21, further comprising:
determining a position of a boom tip of the aerial refueling boom, wherein controlling the aerial refueling boom to engage the fuel receptacle comprises controlling the aerial refueling boom to engage the fuel receptacle based on at least the position of the fuel receptacle and the position of the boom tip.

26. The method of claim 21, further comprising:
generating an overlay image comprising:
a model projection, based on at least an aircraft model and the refined position estimate; and
the video frame showing the aircraft or a subsequent video frame showing the aircraft; and
displaying the overlay image.

27. The method of claim 21, wherein the estimate refiner produces the refined position estimate by comparing the estimated flight history with known aircraft flight path trajectories for refueling aircraft as viewed by a refueling platform.

28. A system for aerial refueling, the system comprising:
one or more processors; and
a memory storing instructions that, when executed by the one or more processors, cause the one or more processors to perform operations comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, position estimation refinement parameters, wherein the refinement parameters comprise a translation refinement and a rotational refinement;
based on at least the estimated flight history for the aircraft and the position estimation refinement parameters, determining, by the estimate refiner, a temporally consistent refined position estimate for the aircraft;
based on at least the refined position estimate for the aircraft, determining a position of a fuel receptacle on the aircraft; and
based on at least the position of the fuel receptacle, controlling an aerial refueling boom to engage the fuel receptacle.

29. The system of claim 28, wherein the video frame is provided by a single camera.

30. The system of claim 28, wherein the estimate refiner comprises a first neural network (NN).

31. The system of claim 28, wherein the estimate refiner comprises an optimizer.

32. The system of claim 28, wherein the operations further comprise:
determining a position of a boom tip of the aerial refueling boom, wherein controlling the aerial refueling boom to engage the fuel receptacle comprises controlling the aerial refueling boom to engage the fuel receptacle based on at least the position of the fuel receptacle and the position of the boom tip.

33. The system of claim 28, further comprising:
a boom control, wherein the processor is to perform the operation of controlling the aerial refueling boom to engage the fuel receptacle via the boom control.

34. The system of claim 28, wherein the estimate refiner produces the refined position estimate by comparing the estimated flight history with known aircraft flight path trajectories for refueling aircraft as viewed by a refueling platform.

35. A computer program product, comprising a non-transitory computer usable medium having a computer readable program code embodied therein, the computer readable program code adapted to be executed to implement a method of aerial refueling, the method comprising:
receiving a video stream showing an aircraft to be refueled, wherein the video stream comprises a plurality of video frames, each video frame showing the aircraft;
determining, for each video frame of the plurality of video frames, an initial position estimate for the aircraft, wherein the initial position estimates for the plurality of video frames comprises an estimated flight history for the aircraft;
based on at least the estimated flight history for the aircraft, determining, by an estimate refiner, position estimation refinement parameters, wherein the refinement parameters comprise a translation refinement and a rotational refinement;
based on at least the estimated flight history for the aircraft and the position estimation refinement parameters, determining, by the estimate refiner, a temporally consistent refined position estimate for the aircraft;
based on at least the refined position estimate for the aircraft, determining a position of a fuel receptacle on the aircraft; and
based on at least the position of the fuel receptacle, controlling an aerial refueling boom to engage the fuel receptacle.

36. The computer program product of claim 35, wherein the video frame is provided by a single camera.

37. The computer program product of claim 35, wherein the estimate refiner comprises a first neural network (NN).

38. The computer program product of claim 35, wherein the estimate refiner comprises an optimizer.

39. The computer program product of claim 35, wherein the method further comprises:
determining a position of a boom tip of the aerial refueling boom, wherein controlling the aerial refueling boom to engage the fuel receptacle comprises controlling the aerial refueling boom to engage the fuel receptacle based on at least the position of the fuel receptacle and the position of the boom tip.

40. The computer program product of claim 35, wherein the estimate refiner produces the refined position estimate by comparing the estimated flight history with known aircraft flight path trajectories for refueling aircraft as viewed by a refueling platform.

* * * * *